US006307573B1

(12) United States Patent
Barros

(10) Patent No.: US 6,307,573 B1
(45) Date of Patent: Oct. 23, 2001

(54) GRAPHIC-INFORMATION FLOW METHOD AND SYSTEM FOR VISUALLY ANALYZING PATTERNS AND RELATIONSHIPS

(76) Inventor: Barbara L. Barros, 10 Maplewood La., Madison, CT (US) 06443

( * ) Notice: Subject to any disclaimer, the term of this patent is extended or adjusted under 35 U.S.C. 154(b) by 0 days.

(21) Appl. No.: 09/359,544

(22) Filed: Jul. 22, 1999

(51) Int. Cl.[7] ....................................................... G06F 3/00
(52) U.S. Cl. .......................... 345/764; 345/854; 345/803; 345/804; 345/440; 705/26; 707/512
(58) Field of Search ..................................... 345/357, 340, 345/343, 346, 335, 333, 339, 968, 440; 705/26, 27; 707/3, 4, 5, 104, 512

(56) References Cited

U.S. PATENT DOCUMENTS

| | | | |
|---|---|---|---|
| 5,475,812 | * | 12/1995 | Corona et al. ........................ 345/344 |
| 5,592,604 | * | 1/1997 | Marusak ............................... 345/340 |
| 5,596,500 | * | 1/1997 | Sprague et al. ...................... 701/213 |
| 5,864,337 | * | 1/1999 | Marvin ................................. 345/338 |
| 5,894,311 | * | 4/1999 | Jackson ................................ 345/440 |
| 5,910,803 | * | 6/1999 | Grau et al. ........................... 345/357 |

* cited by examiner

*Primary Examiner*—Raymond J. Bayerl
*Assistant Examiner*—Cuong T. Thai
(74) *Attorney, Agent, or Firm*—Hopgood, Calimafde, Judlowe & Mondolino LLP

(57) ABSTRACT

A novel display control and information management system seamlessly integrates layered and slotted formatted data from both local and remote sources to provide a highly versatile information display. The system permits selective control of display so that complex data and data flows can be seamlessly accessed with enhanced cognition of salient information by the User.

10 Claims, 29 Drawing Sheets

Graphical User-Interface (GUI) Diagram

1 All Framework components fully-visible on the screen.

2 GUI Framework Components

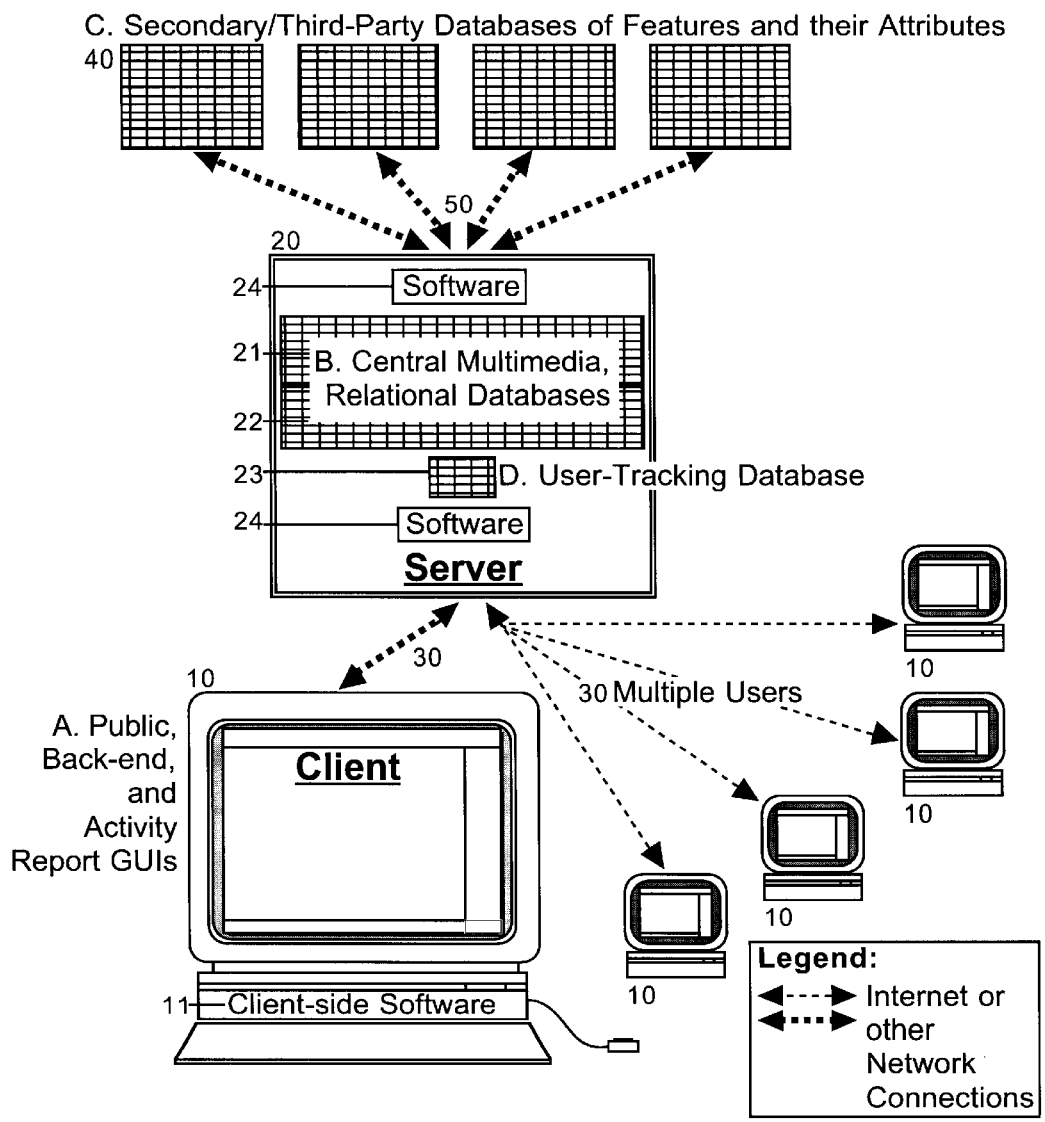
FIG. 1a System Environment

FIG. 1b Hardware Alternatives
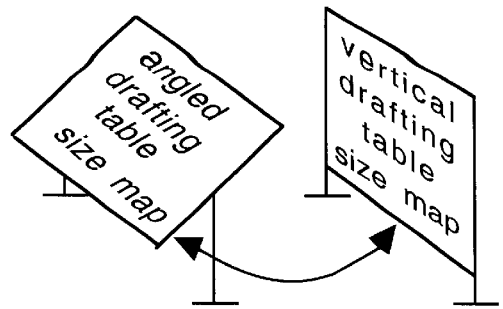
a. high-resolution, large-scale, flat map display for angled work surface or vertical viewing
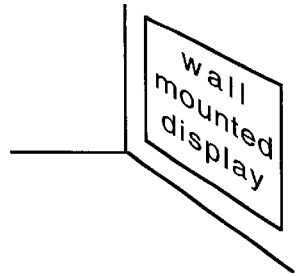
b. large-scale, wall-mounted display
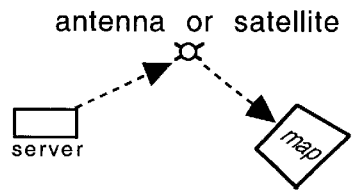
c. wireless, portable map and remote server
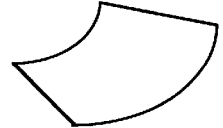
d. portable, flexible, roll-up, flat map display
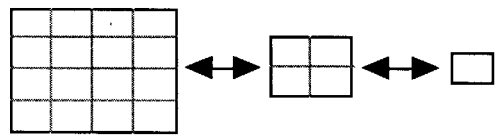
e. portable, fold-up, flat map display
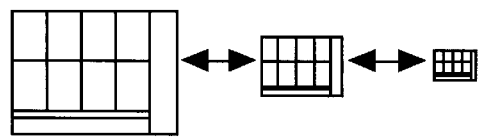
f. map expands and contracts as display is stretched or folded FIG. 2a System Components
primary command and data flow
between the client and the server
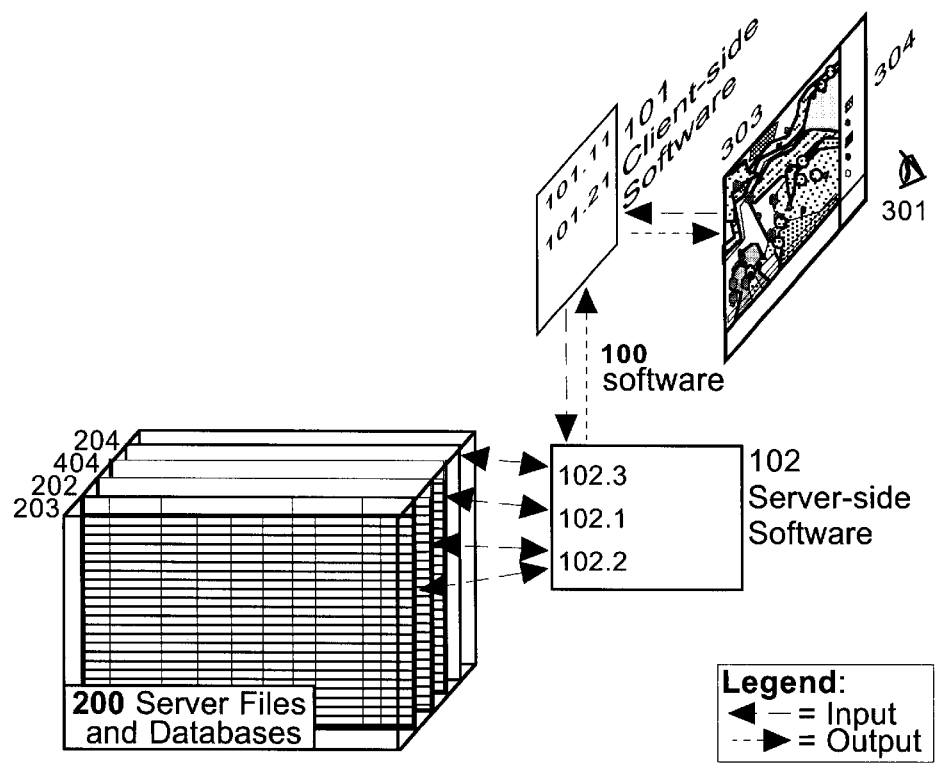

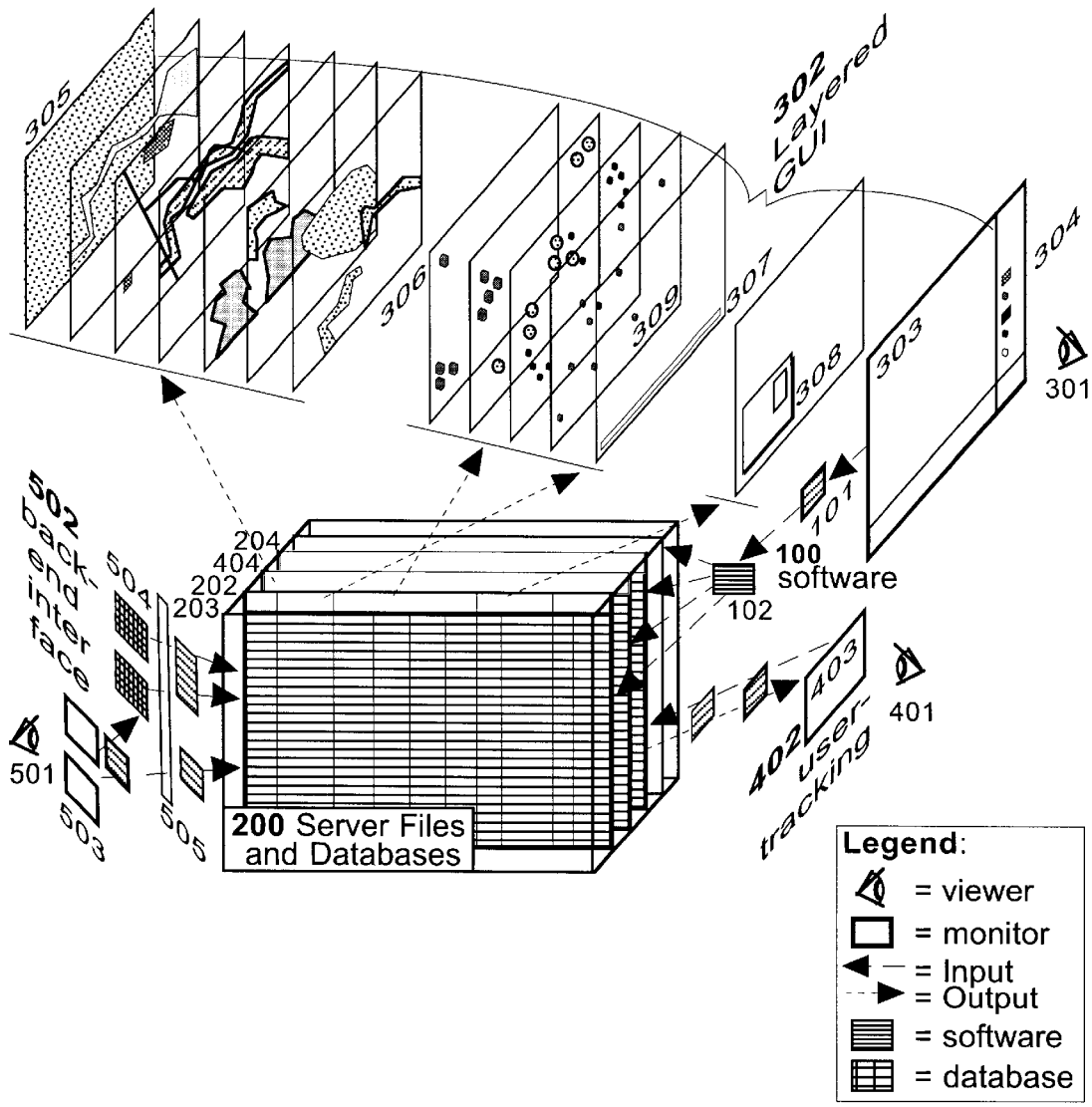
FIG. 2b System Components
system components and x,y,z slotting of GUI coordinate

FIG. 2c System Components
gridded slotting of GUI
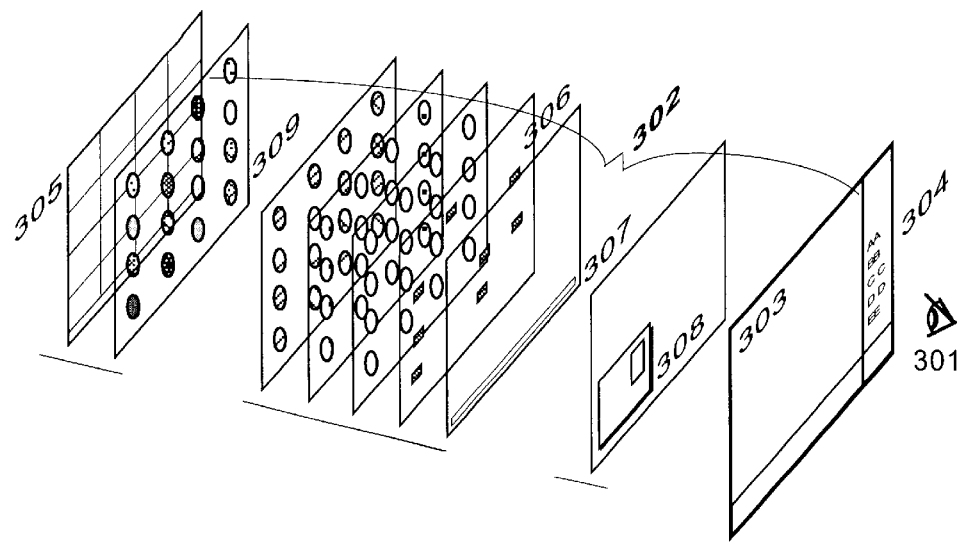

FIG. 3 Basic GUI Layouts and Input/Output
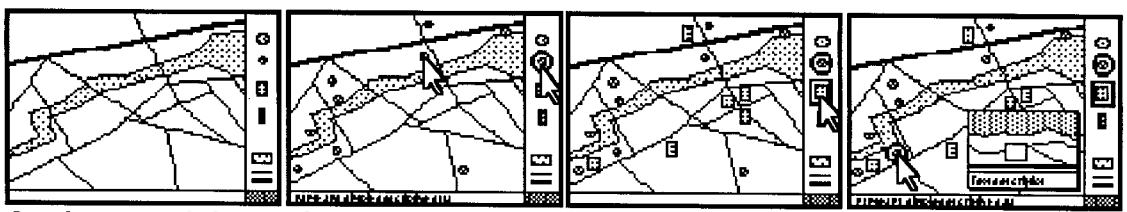
3a Layered Map Set -- using x,y,z coordinates
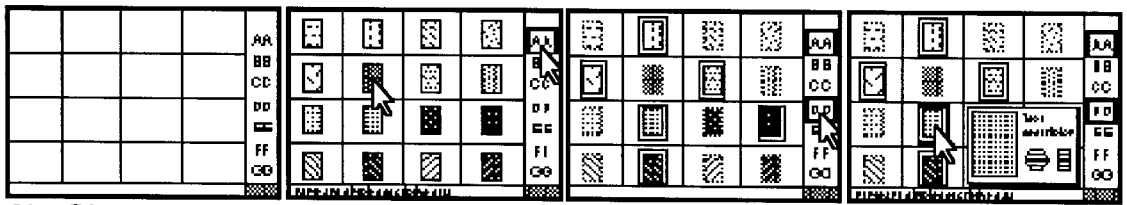
3b Slotted Map Set -- Grid
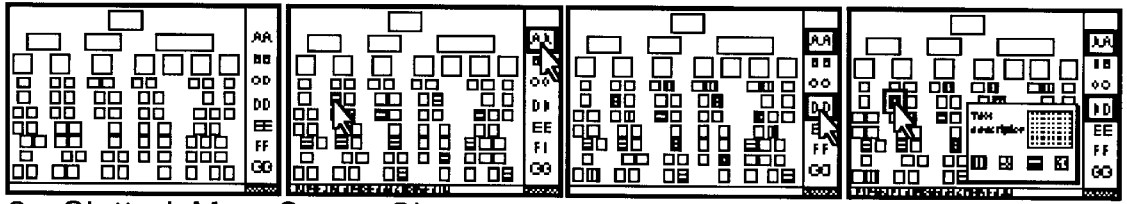
3c Slotted Map Set -- Chart
| 601 Start        | 602 View          | 603 Compare  | 604 View         |
| Base Map &       | Features          | Features     | Annotations      |
| Control Panel    | Key click and     | Second key   | Click on a map   |
|                  | mouseOver         | click        | feature          |

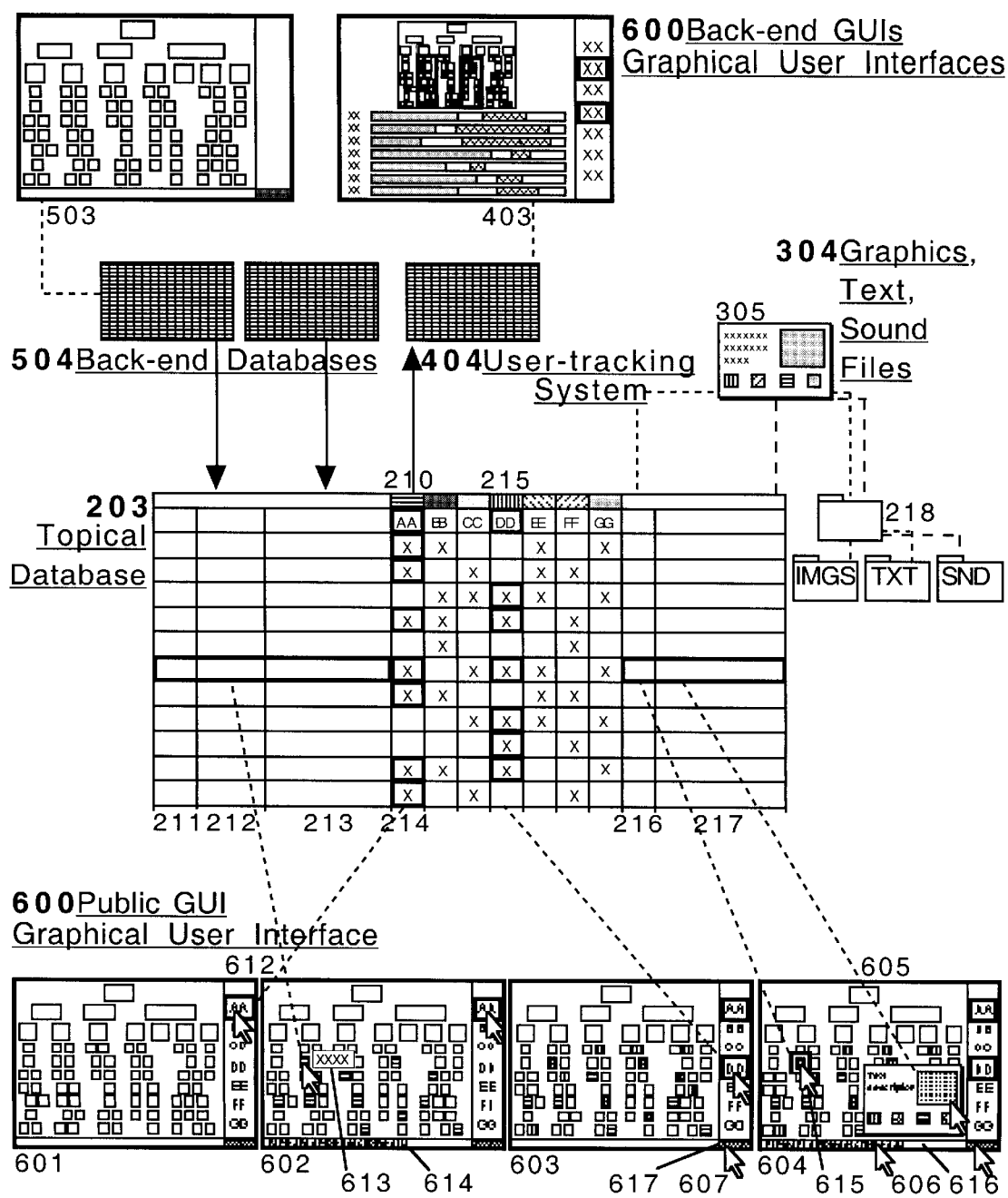

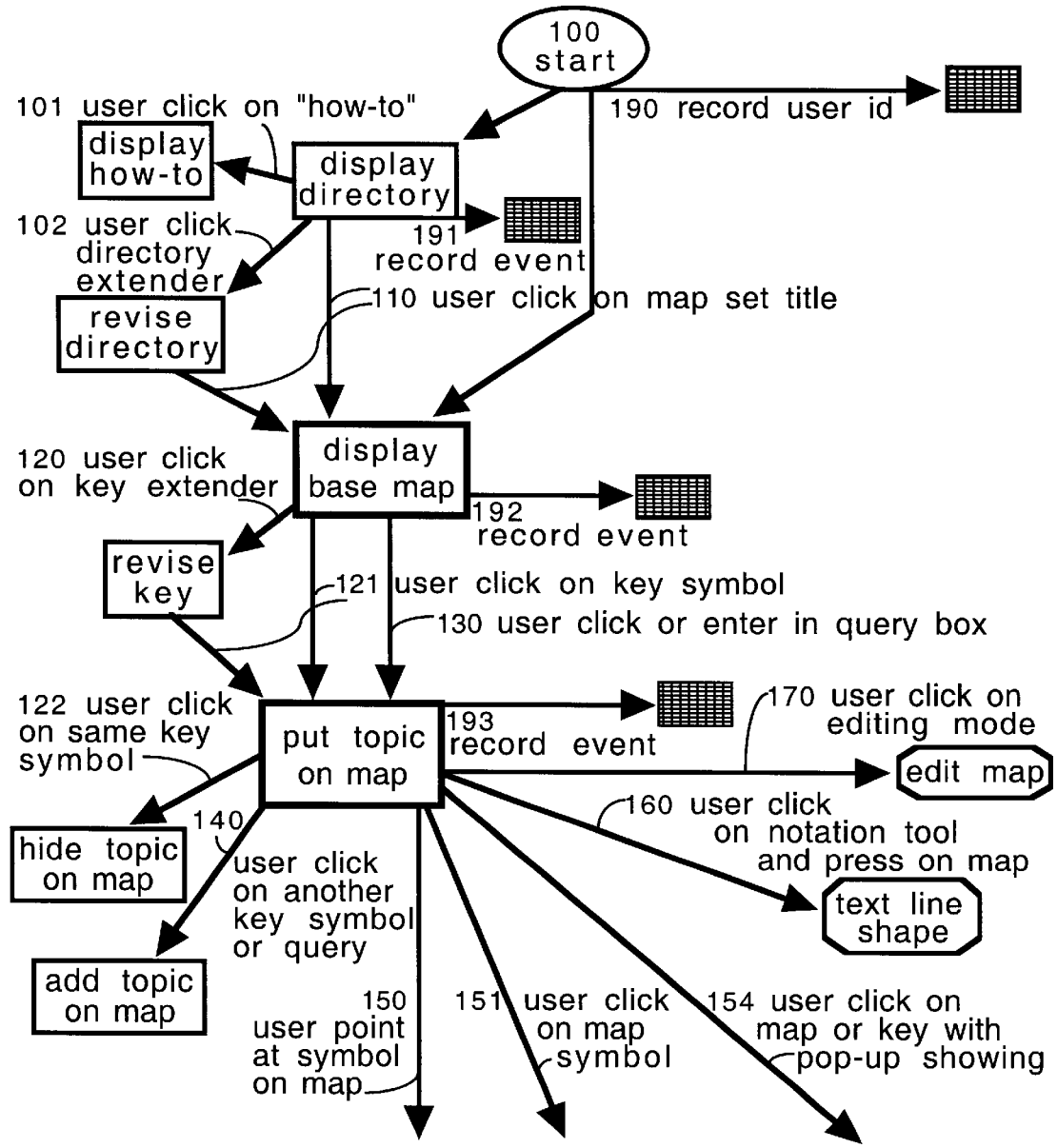
FIG. 5a Software Flow Diagram

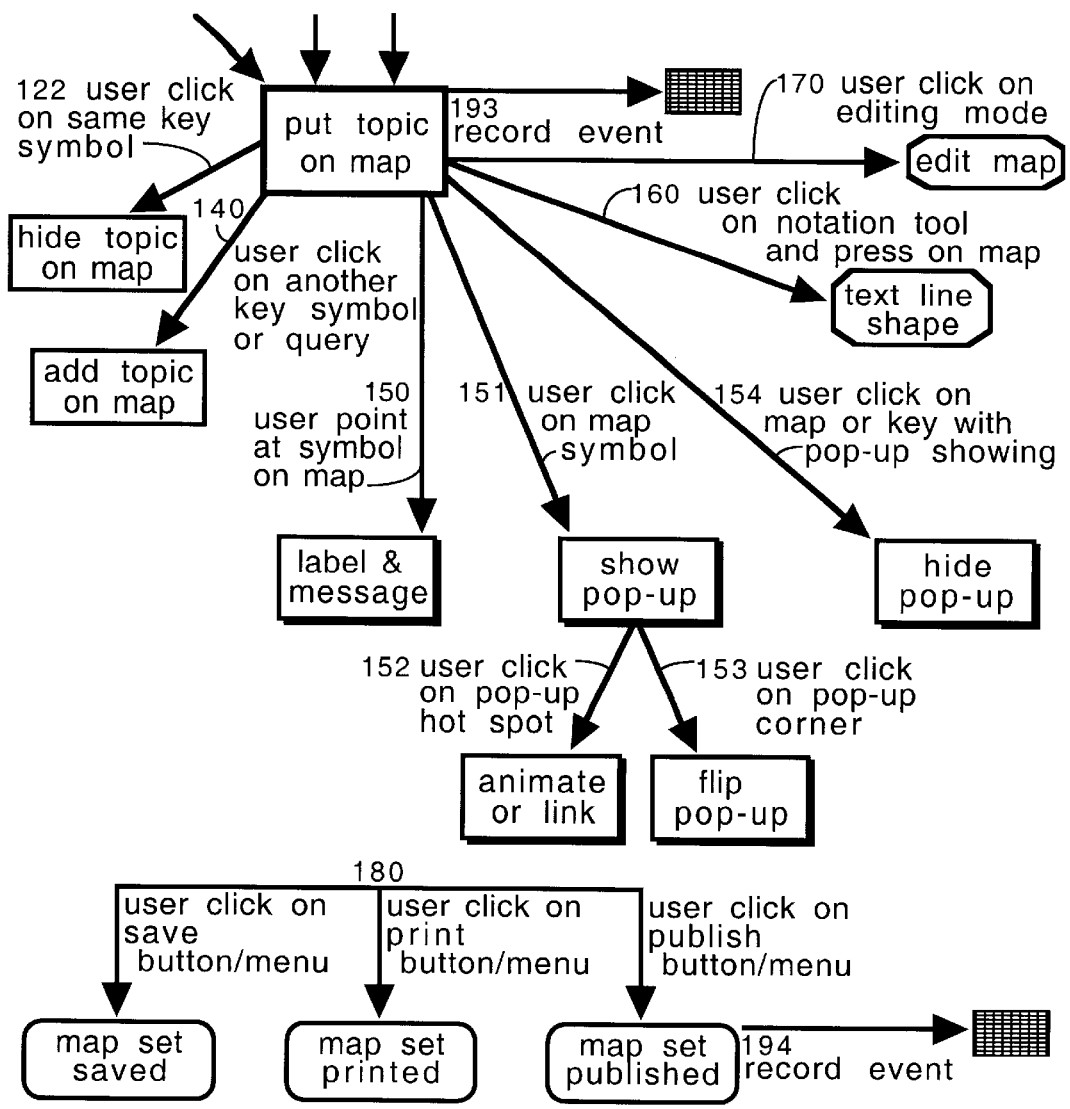
FIG. 5b Software Flow Diagram

FIG. 6a-A Alternative Presentations
1 Directory    2 Map
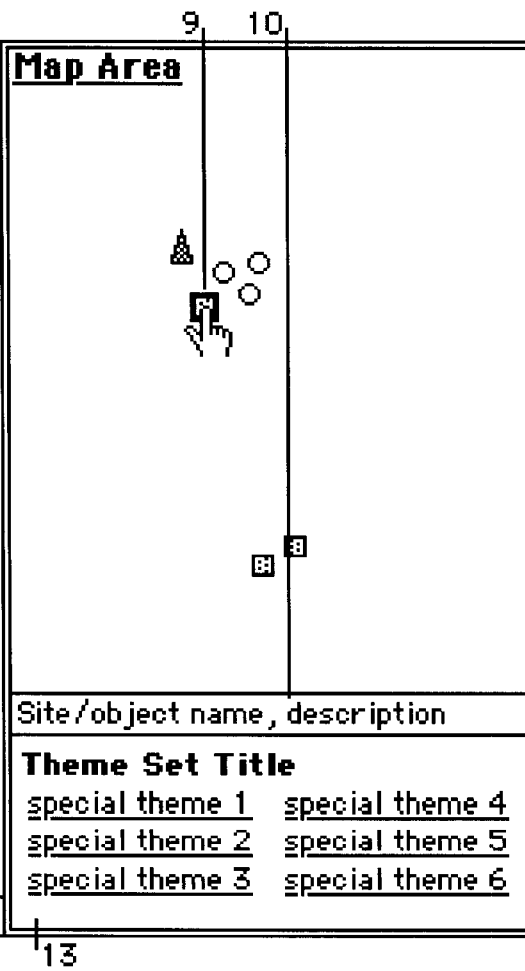

FIG. 6a-B Alternative Presentations
3 Pop-up for Description  4 Key
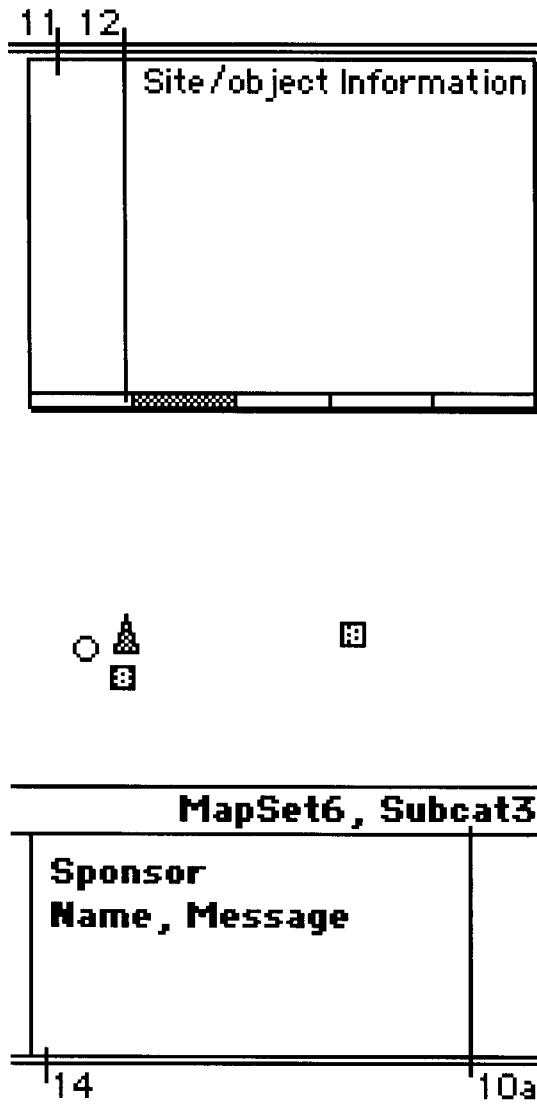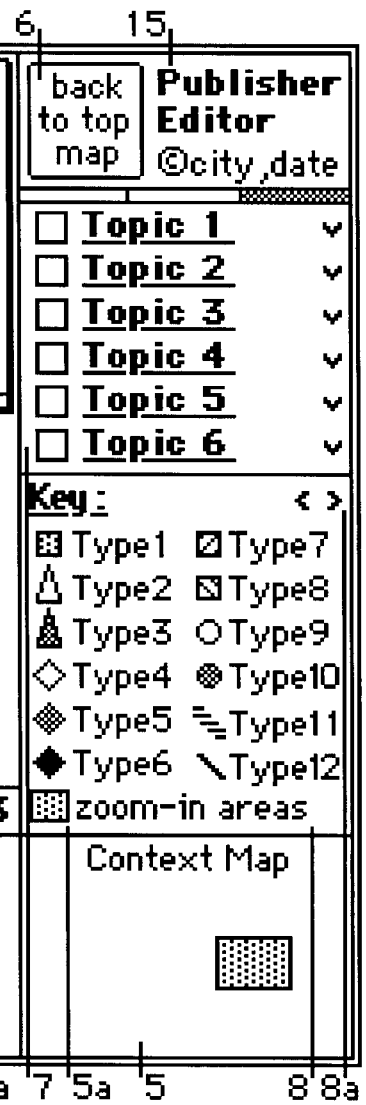
FIG. 6b
5 Pop-up for Query FIG. 6c Alternative Presentations

FIG. 6d Alternative Presentations
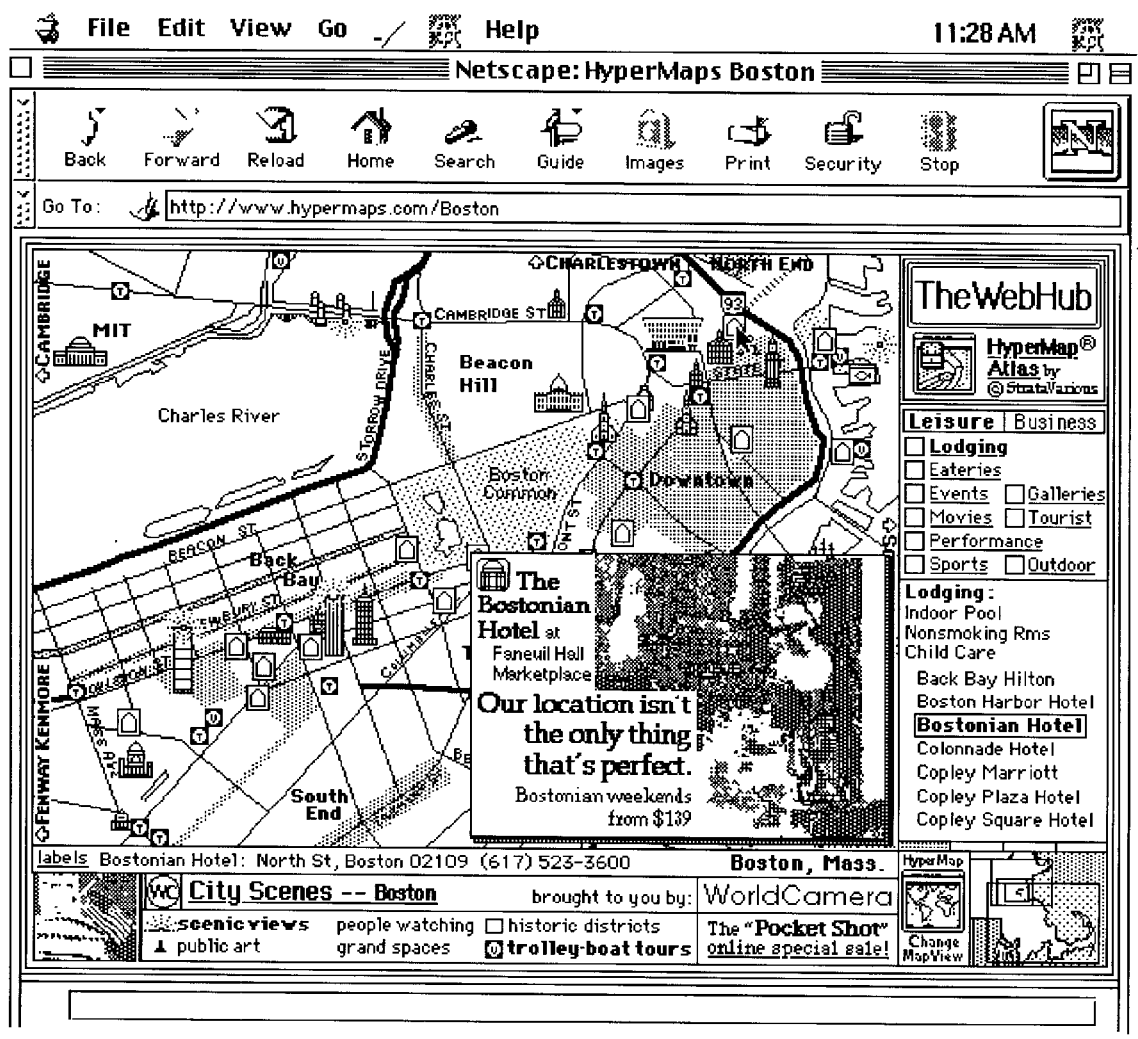

FIG. 6e Alternative Presentations
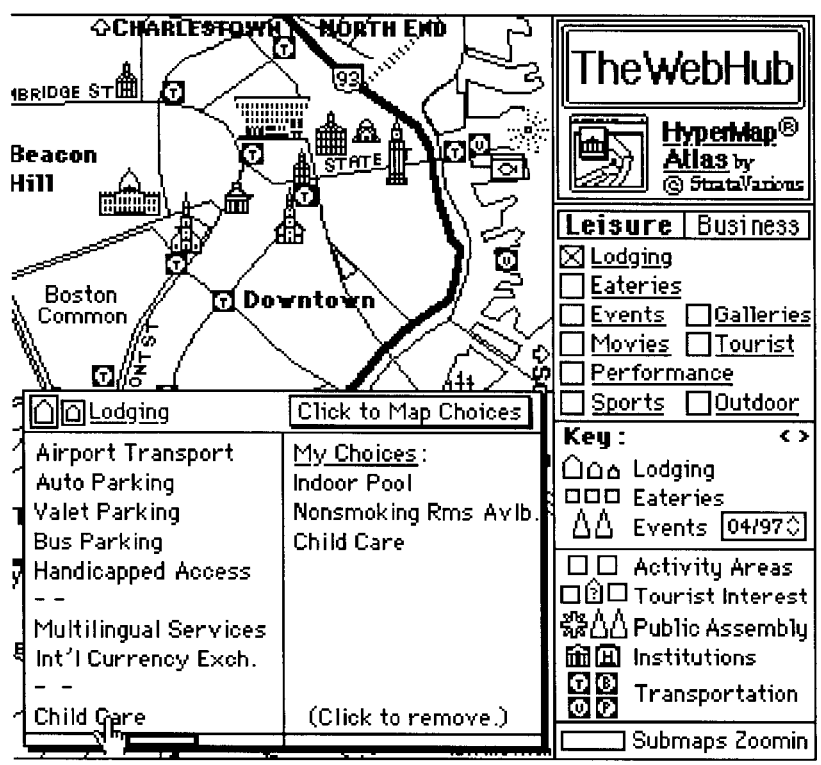

FIG. 7abc A Seamless Stream of Display Screens
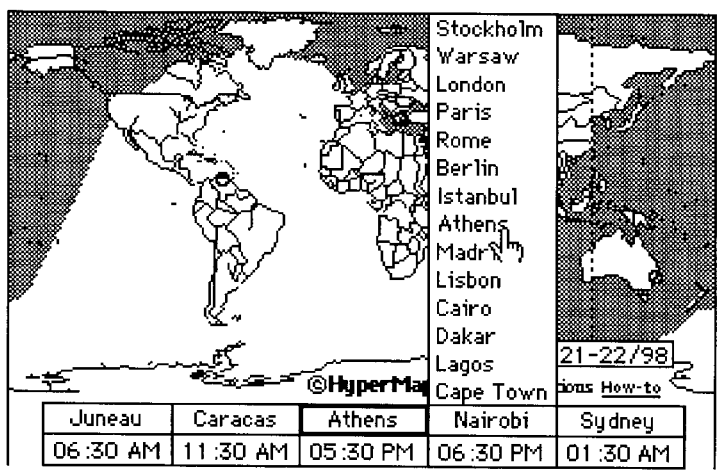
7a
7b                                                                 7c

FIG. 7de A Seamless Stream of Display Screens

7d

7e

FIG. 7fg A Seamless Stream of Display Screens
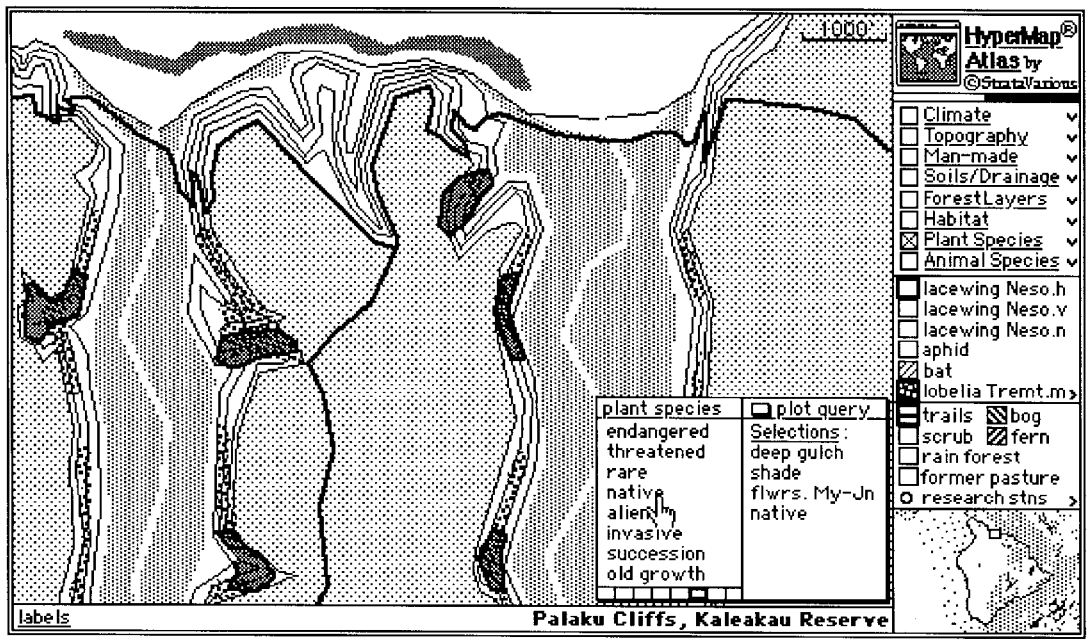
7f
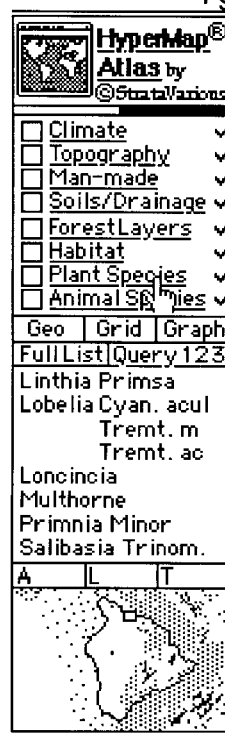
7g

FIG. 7hi A Seamless Stream of Display Screens
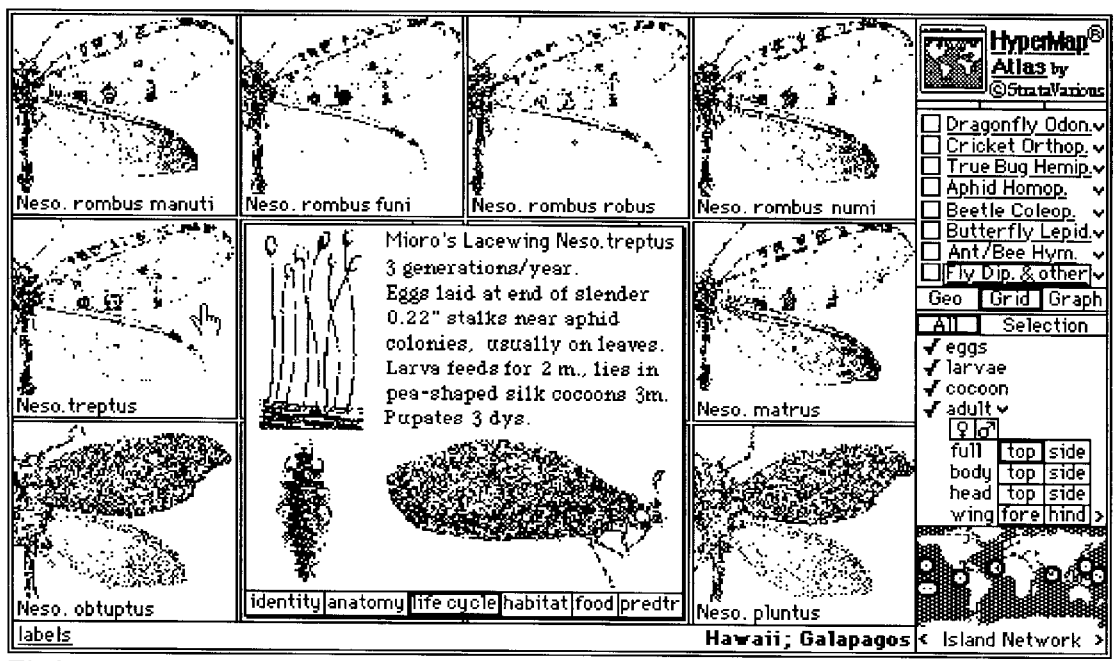
7h Interactive Catalog
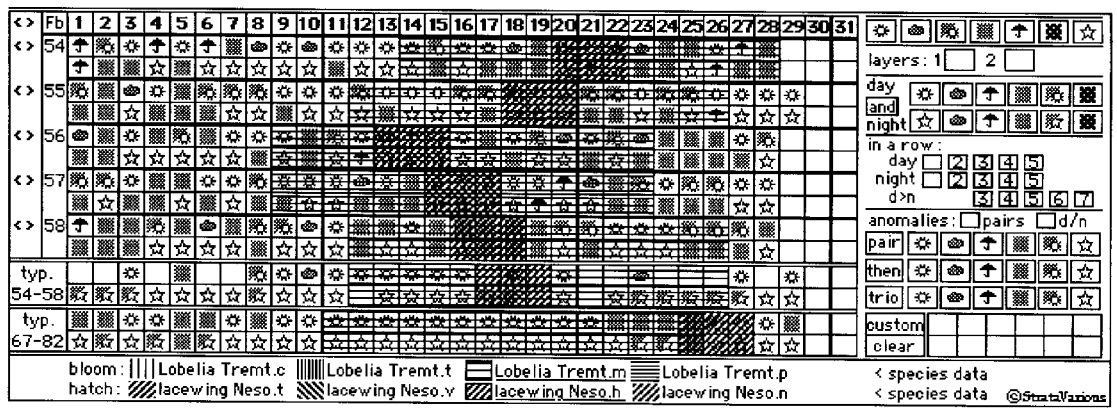
7i Interactive Chart

FIG. 8 Layered Indexes and Keys with Key Extenders, Retrieval Bars
8a
8b
8c
8d
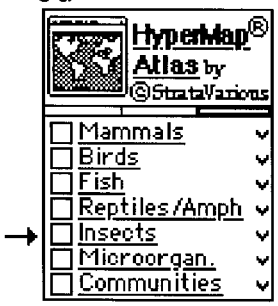
8e
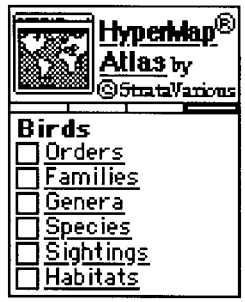
8f
8g
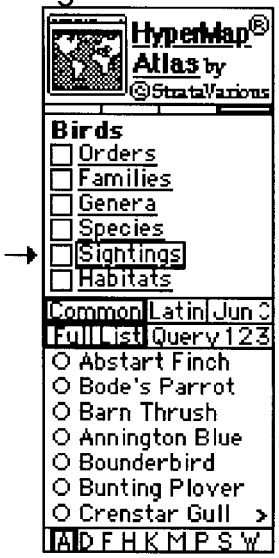
8h
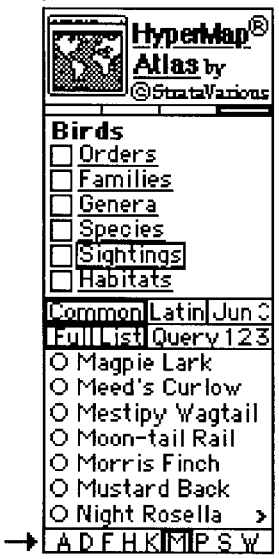

FIG. 9a-A Integrated Informational Advertising
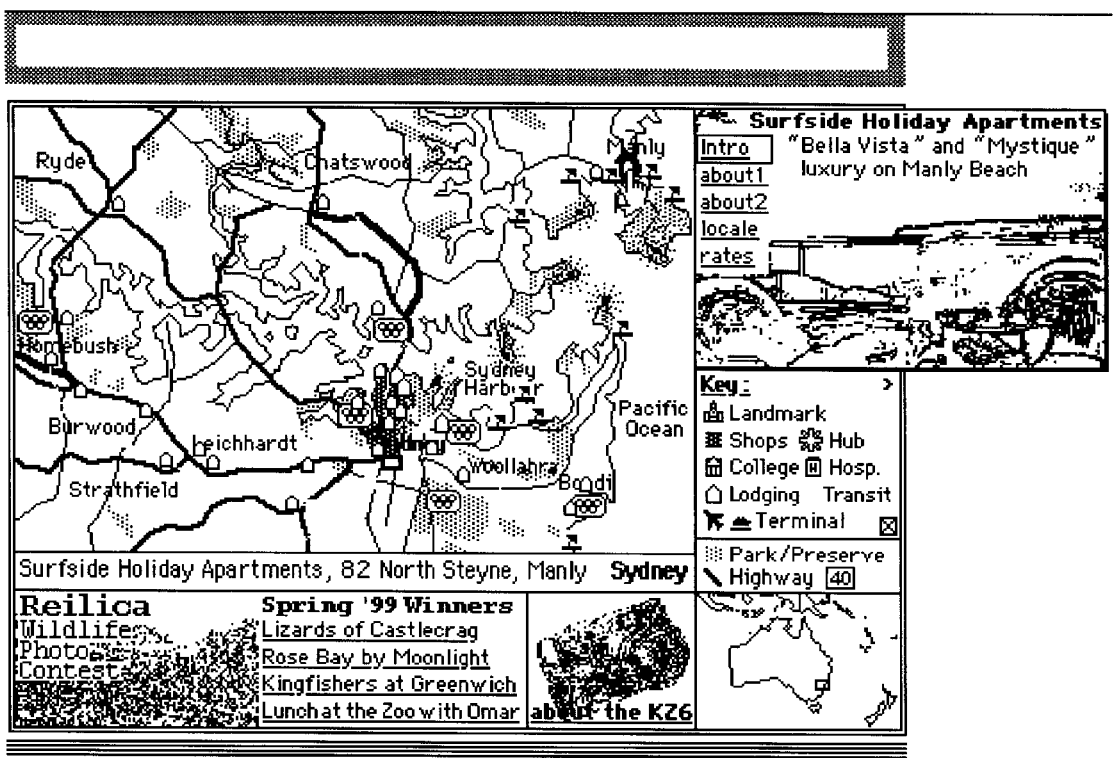
Pop-up ad integrated with map content as pop-up storybook.

FIG. 9a-B Integrated Informational Advertising
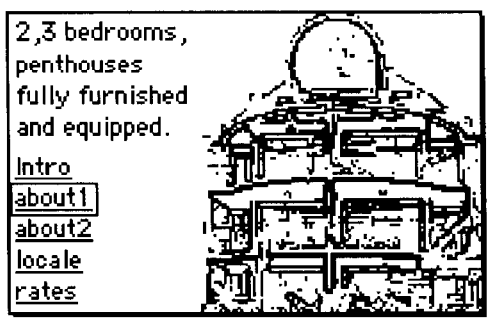
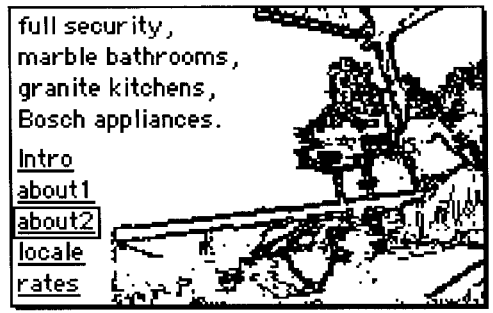
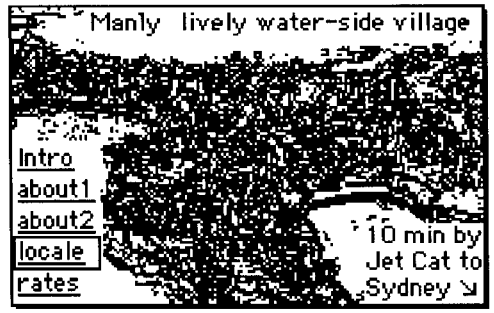
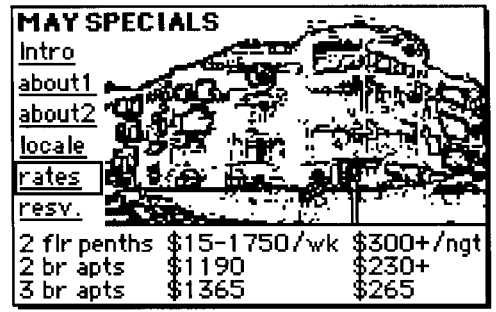
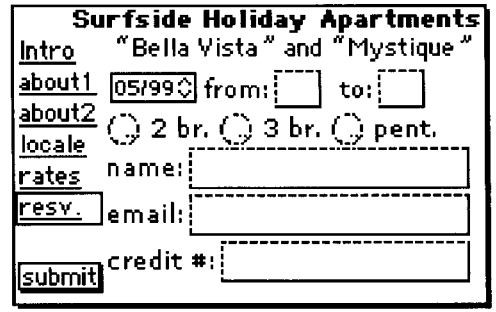
1-6 Pop-up ad integrated with map content as pop-up storybook.

FIG. 9b Integrated Informational Advertising
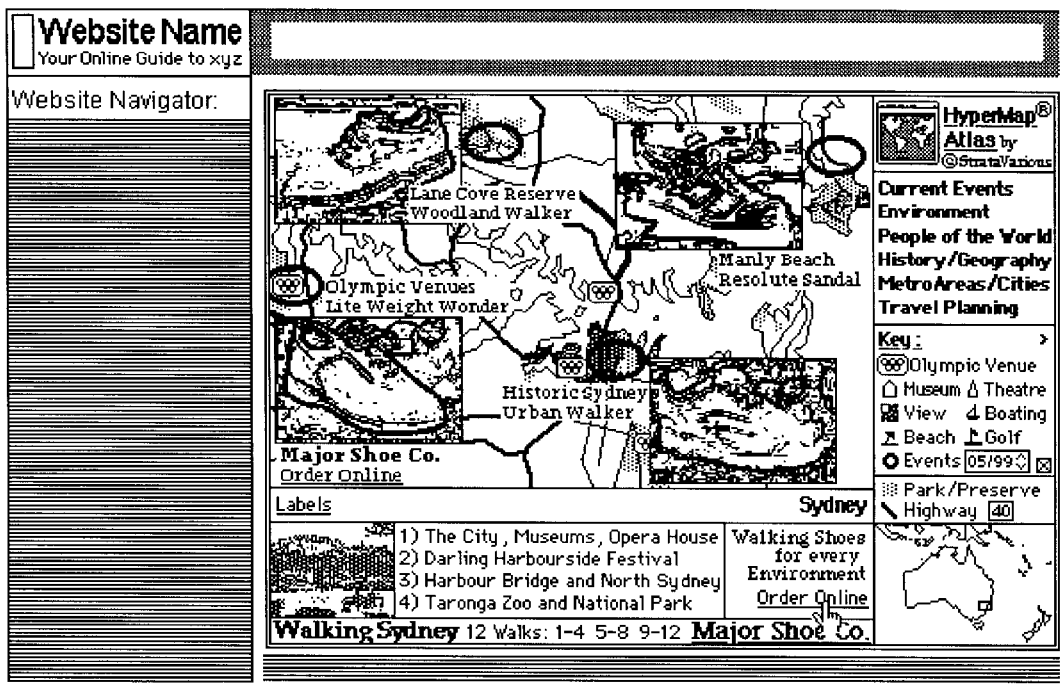
Product offerings integrated with map content

FIG. 9c Integrated Informational Advertising

1 Product catalog in slotted map.

2 Product catalog in slotted map with pop-up.

FIG. 9d Integrated Informational Advertising
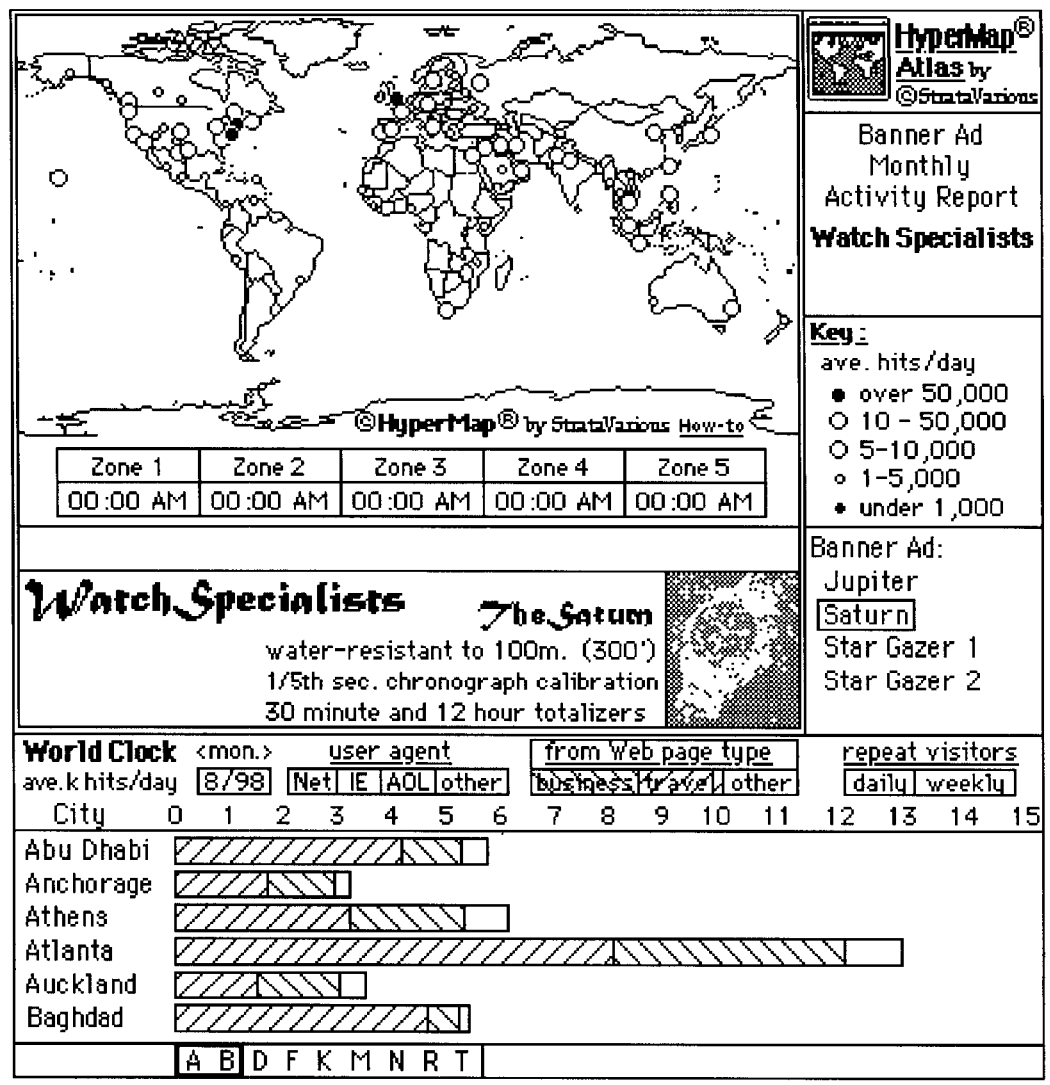
Interactive map-format user-activity report

FIG. 10a Graphical User-Interface (GUI) Diagram
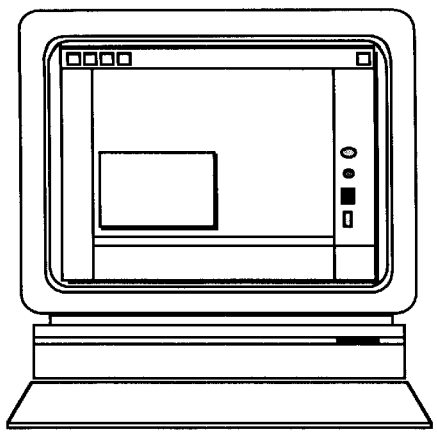
1 All Framework components fully-visible on the screen.
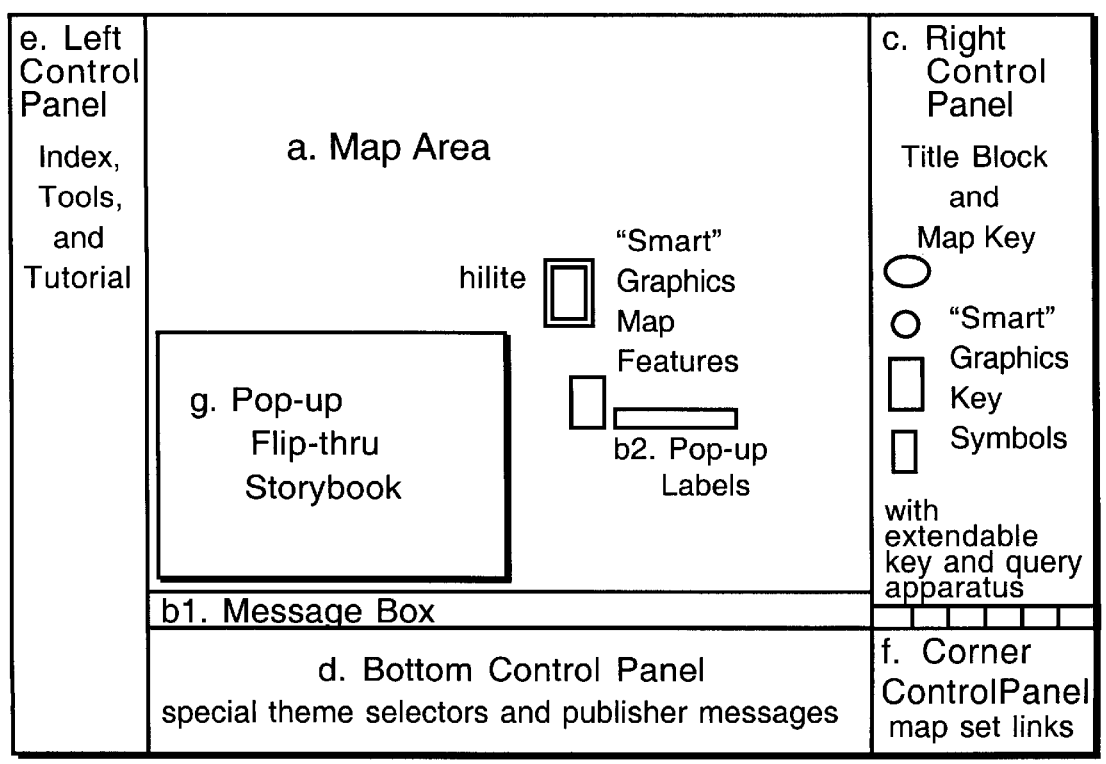
2 GUI Framework Components

FIG. 10b  Graphical User-Interface (GUI) Diagram
| name | sun | soil | height | spacing | water | feed | pests | pH |
|------|-----|------|--------|---------|-------|------|-------|-----|
| pan1 | full | 1 | 24-30" | 12" | 2 | a,b | a,d | 7. |
| pan2 | par | 2 | 24-30" | 12" | 2 | b | c,d | 6. |
| pan3 | par | 3 | 24-36" | 18" | 1 | a,c | c | 6. |
| pos1 | full | 1 | 12-18" | 8-12" | 1 | c | a,c | 6. |
| pos2 | sh | 1 | 18-24" | 18" | 2 | a | b,d | 6. |
| pos3 | full | 2 | 12-18" | 8-12" | 1 | a,b | b,d | 5. |
| pos4 | sh | 2 | 24-36" | 12" | 3 | a,b | b,d | 6. |
| rill1 | par | 2 | 6-12" | 10" | 2 | a,c | a,d | 8. |
| rill2 | full | 2 | 6-12" | 10" | 1 | c | a,c | 8. |
| rill3 | full | 2 | 12-18" | 12" | 2 | a,b | b | 8. |
| rill4 | par | 1 | 6-12" | 12" | 2 | a,b | b,d | 8. |
3 Portion of Topical Database
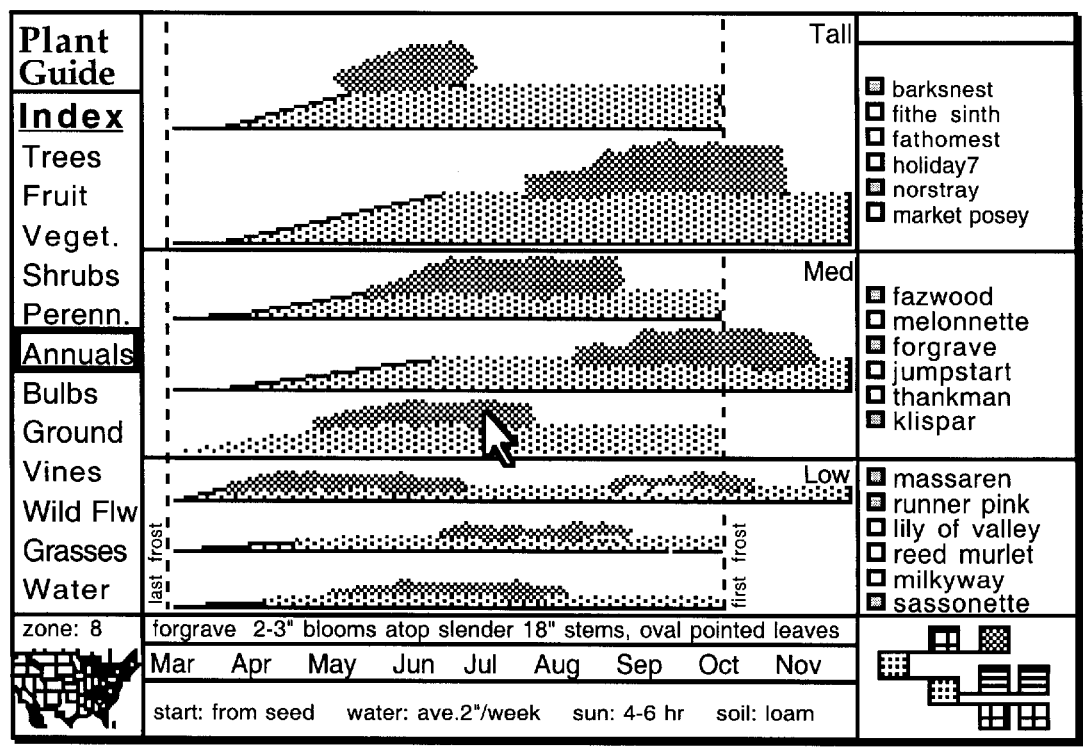
4 Slotted Map – Horizontal Timeline

FIG. 10B (continued)
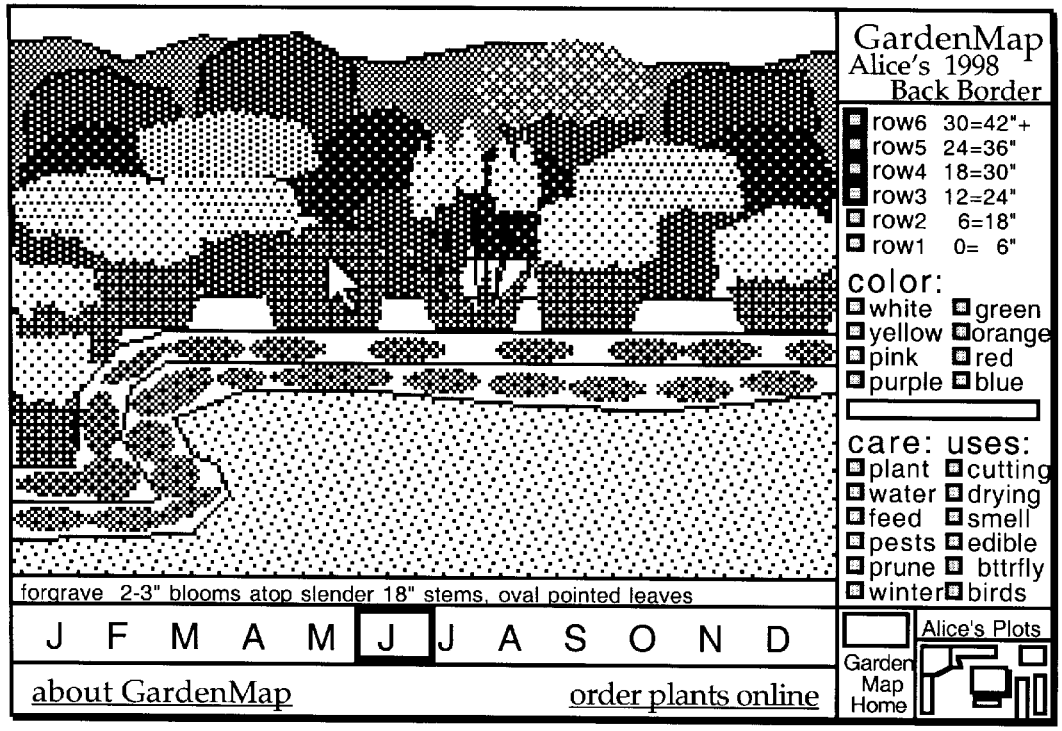
1 Layered Map – Garden Rows
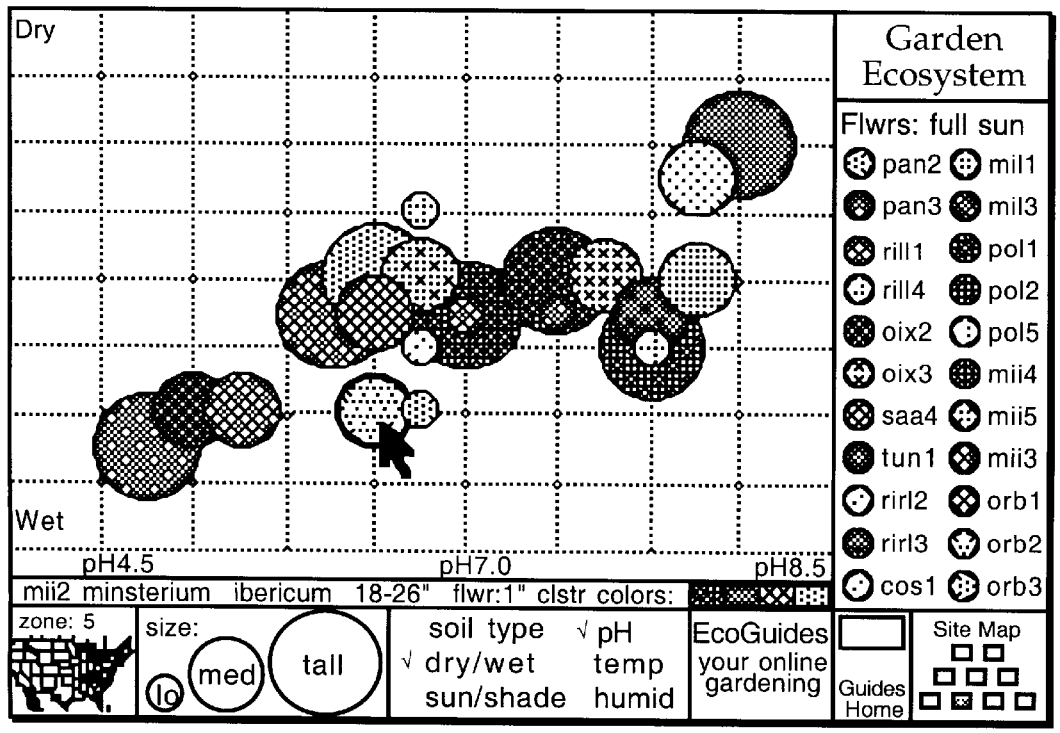
2 Slotted and Layered Graphic Map

FIG. 10B (continued)
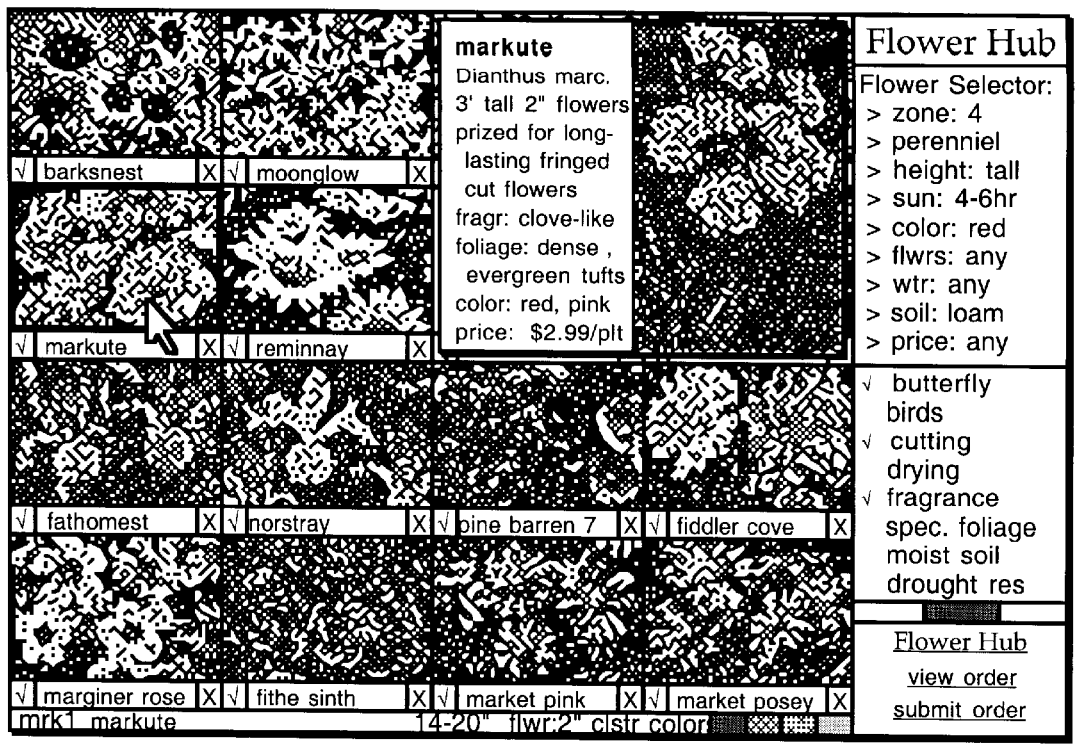
1 Slotted Map with gridded matrix and pop-up storybook
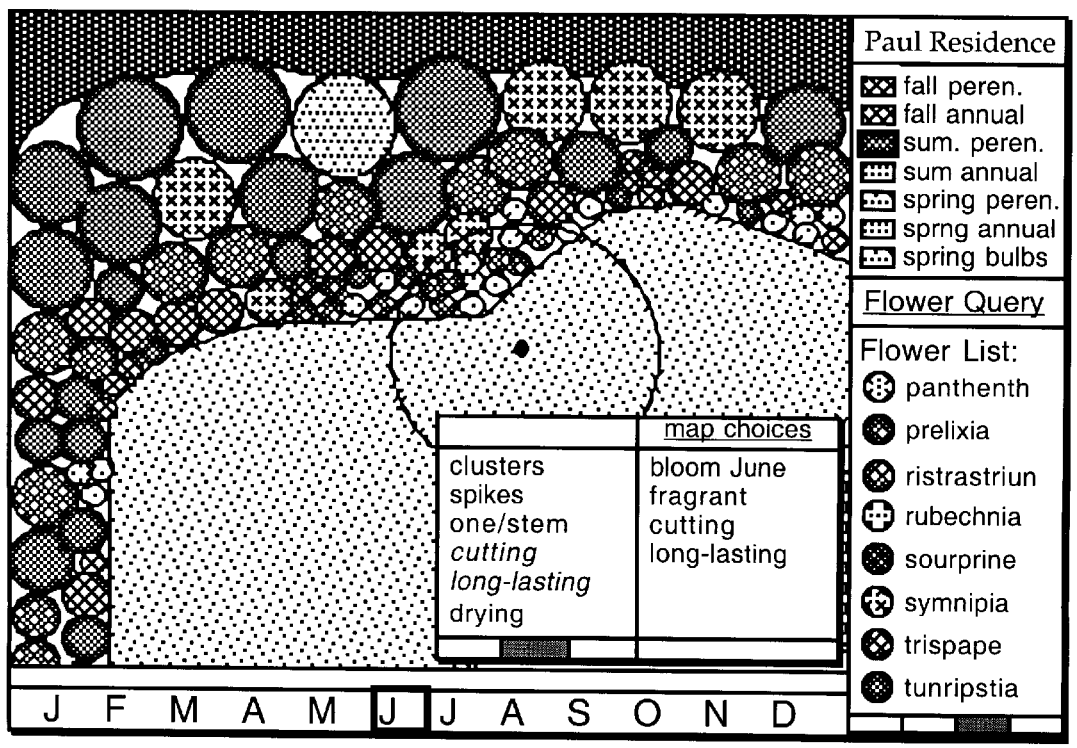
2 Layered and Slotted Map with pop-up query box FIG. 11 Three-Dimensional Model as an Interactive Map
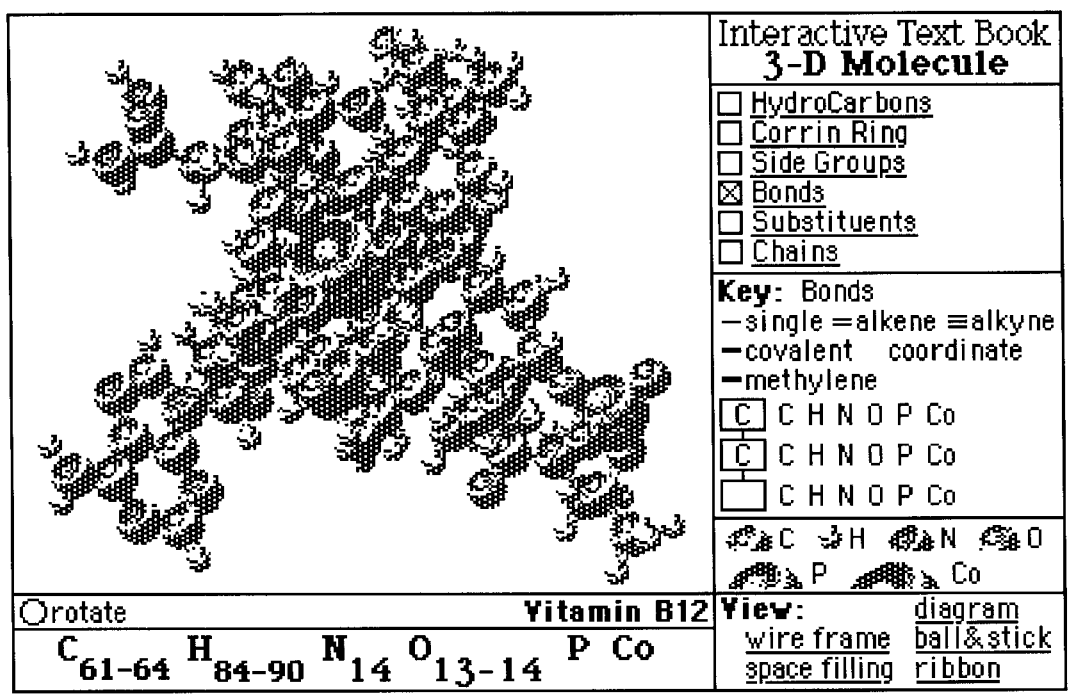

GRAPHIC-INFORMATION FLOW METHOD AND SYSTEM FOR VISUALLY ANALYZING PATTERNS AND RELATIONSHIPS

FIELD OF THE INVENTION

The invention generally relates to computer controlled graphic display systems. More specifically, the present invention provides systems and software for organizing and configuring large, complex sets of graphic information for quick access and in-depth analytical study. The invention enables the integration of information from many sources for viewing in a layered and slotted, interactive map format.

BACKGROUND OF THE INVENTION

Throughout the ages, humans have devised ways to record, then examine, their thoughts and mental images on paper. People draw depictions of events, places, projects, and sets of objects. They chart scientific processes, demographics, weather conditions, and mechanical systems; and they diagram organizations, trade routes, music, and inventions. These drawings aid both the originator and subsequent audiences in picturing spatial or symbolic relationships. Paper drawings and maps are representations of the real world; but often the viewer must struggle to see only what is relevant amidst too much information. Transparent overlays can separate graphic information, but are cumbersome and restrictive. Reference documents such as catalogues, guide books, atlases, and encyclopedias gather together images and text descriptions; but the user must flip back and forth between pages to find, link, and compare information.

Today, computers are now being used to generate, compile, and retrieve such graphic records. However, they have not as yet enabled viewers to smoothly call forth sets of graphic data to inform and stimulate a sustained, multi-faceted, analytical thought process. For example, computer programs that employ graphics layering are currently used to generate illustrations (computer graphics), drawings of designs (CADD), and searchable and thematic geographic maps (GIS).

Computer graphics can be used to draw lines and shapes which may be organized into layers for overlapping and for showing and hiding before being output as a printed or digital illustration. CADD (Computer-Aided Design and Drafting) is used to create plans of products, vehicles, buildings, utility systems, and other three-dimensional objects. CADD employs layering technology to draft and show different views of a three-dimensional object. A GIS (Geographic Information System) plots data on a map with layers of points, lines, and polygons representing land features. Each GIS feature has an entry in a database with its name, a set of coordinates (which may be real-world latitude and longitude) for positioning the feature on the screen, and attribute data which may be shown in a separate window and queried to determine a set of features to be displayed.

These graphics-making programs are used primarily by technicians to produce a singular image for publication and, in limited ways, for interactive analysis. However, non-technicians—the public, executives, and experts in non-computer fields—cannot use them to easily access and manipulate selections of layered materials. Nor can they easily create or assemble their own sets of interactive, layered data.

GIS (Geographic Information Systems) has come furthest in adding interactivity to computer-generated images. Drop-down menus, graphics tools, and palettes are used for customized map production; this slow, unwieldy process is of very limited use for multi-faceted analysis. Networked GIS is used within corporate and government intranets to provide staff access to data displayed on geographic maps; it is also used on World Wide Web sites for the public to find a street address or the location of one particular facility or type of facility (see "Serving Maps on the Internet," by Christian Harder, 1998, Environmental Systems Research Institute, Inc., Redlands, Calif., incorporated herein by reference as if restated in full.) In addition to searching for addresses and facilities, the interactive capabilities of current online GIS include zooming in and out and panning within a large digital map file.

A typical GIS often also has a large database with thematic information for places on the map. However, current GIS does not provide for seamless access to subset combinations from extensive data sets. A legend, table of contents, or key shows a small selection of themes and the symbols associated with subsets within each theme. In some cases, entire themes may be shown or hidden by clicking a check box next to the theme title on the legend; however, a particular subset within a theme cannot be shown or hidden. Current online GIS interfaces rely on the scrolling of palette scroll bars to extend the legend and to view selections for queries; this scrolling breaks the flow of data selection and severely limits the organization and amount of data that can be accessed. Sometimes scrolling is also required to view the entire map and each subsequent iteration, further breaking the flow of the analytical thought process. An notational information, when available, is provided by going to a separate Web page or window; and thereby the material is not viewed smoothly, in direct association with the map feature.

Beyond layering software, another relevant computer technology is hypermedia. Hypermedia is the "linking" technology for instantly retrieving text, images, or sounds. Its "smart" graphics respond to commands such as mouse clicks to "hypertext" or to a "hot" symbol on the computer screen (often referred to as a button, object, icon, or imagemap).

From 1990 to 1993, the inventor developed a hypermedia map-making software program ("CityView/TownView HyperMapping—making maps and map libraries on your computer. A Journal of Demonstration Projects" and software manual, self-published, by Barbara L. Barros, Boston 1994, incorporated herein by reference). This program provided an interactive tutorial and tool with which novice computer-users could make their own map libraries for a study of their neighborhoods, cities, or towns. The software program used the first widely available hypermedia software development tools; APPLE COMPUTER INC.'s two-layered HYPERCARD. On the background layer of the map-making software was a base map either drawn by the user or imported as a scan or GIS-generated bitmap graphic. The user rendered sets of information on separate top layers using paint (raster or bitmap) graphics, text fields, and buttons which could link to new maps, paint layers, and text. The overlays were automatically indexed in a directory from which users could select layers to combine on a new, aggregated map. However, the layers were then fused together, so the map could not be used to aid a flowing analytical thought process.

The primary intent of the "CityView/TownView" map-making software was to enable civil servants and citizens to engage in exercises through which they could improve their awareness of local planning issues and opportunities. The software had several significant limitations: (1) the map features were not objects and could not have data or scripts attached to them, (2) map graphics could only be in black and white which reduced legibility and appeal, (3) the software was dependent on APPLE's MACINTOSH operating system having limited distribution, (4) users tended not to have or be able to afford base map data, and (5) the large amounts of graphic data generated could not be stored on most personal computers or shared easily with others.

CD-ROMs and the World Wide Web are, at this time, the two predominant means of delivering hypermedia. For organizing and displaying material, these current hypermedia use GUI (graphical user-interface) formats which are derivative. They draw from a combination of print publication equivalents, software document-creation conventions, and video presentation methods.

CD-ROMs were the first major application of hypermedia because of the vast storage capability for graphics and sound. These files are linked to create multi-dimensional games, training materials, and reference sources. Current reference CD-ROMS are organized to incrementally access graphic and text information on a single subject, but are not presently designed to enable comparison and to enhance prolonged, dynamic visual analysis.

The second major hypermedia application is the World Wide Web. Presently, the technology favors lengthy text over graphics, and graphics are commonly used as small link buttons and illustrations rather than as the core data set. While searchable GIS maps and ecommerce shopping sites are growing to be among the popular image-intensive applications on the Web, the quality of their interactivity and usefulness for visual analysis and comparison is extremely low. A complex quest is constrained by the slow speed of the Web's current infrastructure and its standard presentation methods.

For example, the Web's current accepted practice of presenting material is based on a page-to-page metaphor related to print magazines. The magazine-like vertical layout requires the scrolling of the page to accommodate the horizontal orientation of the computer screen. The page is made up of magazine-like article, illustration, and ad components. The eye roams from component to component, viewing each separately. Text is often lengthy. To obtain additional information, hypertext, symbols, drop-down menus, or query forms are clicked to call up an entirely new Web page. Often the new material is at a different Web site with a different format. The viewer attempts, with minimal success, to carry in the mind's eye the sequence of information, links, and pages. The viewer must build a mental model of the findings of their inquiry, instead of having this accomplished for them in the computer. It was this understanding and recognition of the problems with the prior art system that formed the impetus for the present invention.

OBJECTS AND SUMMARY OF THE PRESENT INVENTION

It is an object of the present invention to provide an interactive data flow and display system for viewing complex information in a simplified and intuitive process.

It is another object of the present invention to provide a method and system for studying and comparing visual representations of multiple data sets.

It is another object of the present invention to provide a computer system for navigating through extensive databases of diverse multimedia wherein information is presented on an interactive, keyed map or diagram display in selectively complex layers optimized for user comprehension via computer- and/or user-selected image control paradigms.

It is yet another object of the present invention to augment the current, page-to-page World Wide Web file display metaphor with a display logic governed by layering information densely in response to interactive user commands.

It is still another object of the present invention to provide a network-based browsing scheme that provides common layering formats and layout and navigation conventions for simplified orientation and operation.

It is another object of the present invention to provide special control apparatus for organizing complex information sets and for user-retrieval of selections as layered or slotted maps and diagrams.

It is another object of the present invention to provide annotation mechanisms to display text data and pop-up, interactive descriptions about map and diagram objects.

It is another object of the present invention to provide the ability to establish standard or common database formats whereby content-providers and users can submit data for display and comparison with other data. The data may be entered on a traditional database interface or with editing tools on an interface showing the relevant map or diagram.

It is a further object of the present invention to provide an interactive display system that is connected to a network so that remote data sources may be accessed and displayed in a seamless manner.

It is another object of the present invention to provide a program-controlled computer system that is interconnected to a plurality of remote data sources so that display data includes current information.

The above and other objects of the present invention are realized in a program-controlled interactive data processor, such as a personal computer, connected to and in communication with a server and linked to a plurality of databases and associated software. These databases, either locally or remotely located, comprise a vast amount of diverse information on select topics. The personal computer includes local programming to control the layout of information displayed on the user display. The display includes multiple, context-sensitive control panels or palettes for manipulating the information (symbols, text, drawings, photographs, etc.) presented on the user display in accordance with a selection protocol. This protocol implements a data layering process, wherein information is formatted and displayed in response to user control inputs and stored instructions, optimizing the display layout so that information is quickly presented in a form that is readily comprehended despite its complexity. Only information necessary for current assessment is presented without superfluous data elements. Relevant information is thus presented in a seamless, streamlined manner.

In accordance with the varying features of the present invention, the computer system includes supplemental, back-end, and user-tracking databases. The back-end database continuously or periodically gathers and stores new and changeable information so that the displayed information is always current. The user-tracking database tracks user events on the personal computer with the stored data used to return proper map data, to collect and archive data for the user, to provide data to a user's intelligent agent, and to prepare interactive map and diagram analysis reports on anonymous, aggregated user activity patterns.

The foregoing features of the present invention may be better understood by review of the following description of an illustrative example thereof, taken in conjunction with the drawings of which:

BRIEF DESCRIPTION OF THE FIGURES

FIG. 1a provides a functional block diagram of the system environment for the present invention;

FIG. 1b provides examples of alternative personal computer devices to display the present invention;

FIG. 2a provides an exploded presentation of the primary command and data flow between the client and the server;

FIG. 2b provides an exploded presentation of the system components with an x,y,z coordinate slotting of the GUI (Graphical User Interface) presented and controlled by the present invention;

FIG. 2c provides an exploded presentation of the gridded slotting of the GUI associated with image processing of the present invention;

FIG. 3 provides three examples of the basic map layout and input/output within the GUI (Graphical User Interface) for the present invention;

FIG. 4 provides a GUI/database operations diagram of the present invention;

FIG. 5 provides a logic flow diagram for the present invention;

FIGS. 6a–b depict the components of the graphical user-interface associated with the present invention;

FIGS. 6c–e depict alternative presentations with the inventive system;

FIGS. 7a–i depict a seamless stream of display screens for the present invention;

FIGS. 8a–h depict layered indexes and keys with key extenders and retrieval bars to organize and access a large information set;

FIGS. 9a–d provide examples of informational advertising integrated into the present system including an interactive map-format user-activity report;

FIGS. 10a–b provide examples of a variety of map displays derived from the same database; and FIG. 11 provides an example of a three-dimensional model as an interactive map.

DETAILED DESCRIPTION OF THE INVENTION

First, briefly in overview, the present invention is a computer technology employing a next-generation computer interface, multi-media databases, and a user-tracking system to dynamically build a customized, interactive mapset. It enables content-producers to offer material as standard-formatted data that can be "picked up" by users as they browse. It enables the user to seamlessly follow a sustained, multi-faceted, analytical thought process by manipulating "map" components, layers, and annotations.

The graphic-information flow method and system uses layering and hypermedia technology to maximize the flow of information, insights, and ideas during the process of inquiry. The invention provides an external aid to enhance reflective cognition ("Things That Make Us Smart," by Donald A. Norman, Addison-Wesley Publishing Company, 1993, incorporated herein by reference as if restated in full). The present invention is a true browsing device for smoothly pursuing a question, for analyzing, exploring, and discovering, for comparing variations, for studying patterns and relationships, and for reaching well-informed decisions.

The graphic-information flow method and system is designed to enable continuous, focused concentration so that the computer screen becomes an extension of the mind's eye. The present invention enables the user to seamlessly follow a sustained, multi-faceted, analytical thought process by manipulating "map" components, layers, and annotations. Just the diagram pertinent to the moment is viewed, free of distracting, irrelevant information.

Unlike expert and artificial-intelligence systems, here the human being is the intelligent expert with the present invention serving to augment the human thought process. The users of the graphic-information flow method and system are active participants. They gain knowledge and understanding through the hands-on process of map-making. Users customize information sets by selecting layers and filling slots, then by querying to refine them. Individual analysis is further supported by providing marking tools to both stimulate and record insights.

The invention combines hypermedia and layering technologies. It enables layers produced by graphics, drafting, and information systems to be organized and formatted into easy-to-use frameworks. Non-technical producers can create multi-dimensional interactive documents and reports for wide distribution. The maps can be accessed by non-technical audiences either the general public or experts in a field of study.

The map-based, graphic-information flow method and system can be used to significantly improve the ability to study almost any complex subject. By representing a place, topic, or thing in a multi-dimensional map, previously-hard-to-recognize patterns and relationships can be discovered. These would otherwise not be apparent by attempting to view directly the place, topic, or thing or by more traditional analytical methods.

The method and system employs what is sometimes termed "cognitive art"—visual representations that aid the comprehension of complex information sets. ("The Visual Display of Quantitative Information" 1983, "Envisioning Information" 1990, and "Visual Explanations" 1997 by Edward R. Tufte, Graphics Press, Cheshire, Conn., incorporated herein by reference as if restated in full). The term "map" is most commonly associated with a flat, simplified representation of a landscape from above. A map can also be any visual portrayal of a geographic area or imaginary place including a cartographic, diagrammatic, photographic, perspective, or bird's-eye-view image or three-dimensional model. As well, a map can be a diagrammatic representation of a complex object (the human body, a vehicle, a building). A map can also graphically portray a topic for which a set of pictures or words are understood more clearly in a series of subsets and in relationship to each other (an organizational chart, a chemical sequence, or a set of scaled, color images of possible plants for the garden of different heights and flowering seasons).

In relation to the present invention, the important addition to any such picture, chart, diagram, or graph that makes it a "map" is the provision of interactive keys. These keys do more than merely define map symbols. The interactive keys enable the user to quickly switch between views showing only selected subsets of interest at the moment.

The resulting ability to instantaneously customize views of information sets supports a mapping process of:

1) setting out the significant features of a place, topic, or thing,
2) defining the features' relevant attributes,
3) seeing what attributes various features have in common and how they differ,
4) detecting how often or rarely features and attributes occur, and in what patterns, and 5) noticing the significance of their real or symbolic proximity to one another.

Understanding of the patterns and relationships often benefits from annotations viewed temporarily in association with map features. In the present invention, text, charts, drawings, photographs, animations, sound, or video footage may be attached as annotations to map features.

The present invention combines a diagrammatic map with illustrative pop-ups. This dual-view design reflects the analytical mind's-eye process of switching back and forth between the overview structural image of a subject and close-up, eye-level views or "vignettes" of particular features. To aid this mental process, two perspectives can be seen at once. First, the content of the overview is pulled apart and organized into layers or matrices. Second, the descriptive feature view is shown directly in association with the feature's place on the overview.

The overview enables examination of numerous meta-representations of the whole place, topic, or thing. By switching groups of features in the layers or slots, the viewer can focus on studying patterns and relationships within particular subsets of the whole.

Individual features can be examined "up close" via pop-up annotations. For the same reasons that sidebars, summaries, and sound-bytes are useful and effective, the material in these descriptive close-ups is stripped to the essentials and consolidated into graphic representations and short text. These annotations are accessed in digestible chunks within "pop-up, flip-thru storybooks." The viewer studies an introductory pop-up card, then can click to go forward or backward in a series of flip-cards which further describe the map feature. In the storybooks, short flip-card animations are used to economically create dramatic explanation. When animation and video is used in pop-ups, it is in the form of short clips. Animation and video is used not to purely entertain. Its purpose is to clarify or explain the character and multi-dimensional aspects of a place or object, product assembly procedures, or the pattern of a movement such as a rock-climbing maneuver or a hurricane's path. Pop-up materials are concise in order to augment and enlighten, but not distract from, the study of the map overview.

The graphic-information flow system is perceived as a set of "maps"—an atlas or a catalogue. Thereby the body of information attains the feeling and credibility of a single reference object even though materials may be pulled dynamically from many sources. The invention enables data from these numerous sources to be stored in a common format so that, for each user, material is gathered during the browsing process into a personalized mapset.

The present invention provides an online alternative to reference books such as product catalogues, yellow pages directories, travel guidebooks, entertainment listings, encyclopedias, natural history guides, text books, machine manuals, and land-use planning reports. The present invention can also provide an online specialty store where consumers can ask to see and compare all the available offerings for a particular item from a multitude of manufacturers and distributors. As well, the present invention can be used to create an image-based library for comparing similar objects such as ceramic vases, volcano eruptions, colonial churches, and butterflies.

With the graphic-information flow system, producers of information gain by being able to reach viewers more effectively than by current print and electronic methods. At this time, Internet producers put up a self-standing Web site which viewers must learn of and locate, usually via a search engine, and then must browse through to find one piece of information at a time. The present invention enables the creation of digital repositories with standardized formatting to aggregate data from many sources. With the graphic-information flow method and system, the value of every piece of information is increased exponentially by being easily viewable in proximity with other related information. Viewers can comparison shop for products, travel plans, and points-of-view.

Pop-up annotations augment without breaking the comparison process. Each pop-up is a sidebar-like annotation to the body of information on the main viewing area of the map; therefore viewers are more likely to take a few moments to explore the descriptive material without fear of getting lost. The map remains the orientating device to come back to. Viewers feel in control and can digest the descriptive material at their own pace. Pop-ups about geographic sites have added power because they are seen and remembered in association with the site's location. Pop-ups can serve as an effective and useful advertising mechanism sought after by prospective consumers. Unlike Web banner ads, viewers are actually asking to see the ads or "infotizements" because they are associated with the topics the viewers are researching.

With the annotation and publishing tools, users of the graphic-information flow method and system can define new features and attributes to contribute to a mapset and can post new layers and mapsets online to share with others. The graphic-information flow method and system is intended to take publishing beyond the single-source, broadcast model to the many-to-many model. At the same time it is intended to provide the ability for respected experts and information-integrators to create tangible, credible, "branded" hubs that take responsibility for the quality of the content they make available.

The graphic-information flow method and system for visually analyzing patterns and relationships is a computerized reference map system for assembling and integrating a set of materials about a place, topic, or thing in order to enhance the flow of information during the process of searching for knowledge and insight. A database-derived "map" displays representations of a place or a set of objects to be compared. This single, compact computer user-interface with layered indexes, keys, and content enables discrete sets of material from a dispersed network of large, multimedia databases to be accessed smoothly and repeatedly.

The method and system software uses layered and slotted maps with clickable map keys. The viewer manipulates "map" components, content layers, and annotations by clicking symbols. Clicking symbols on map keys and query boxes shows and hides graphic features with requested attributes. The features are organized in map layers and slots. Clicking map features shows and hides text messages and pop-up annotations about the features. The viewer thereby easily studies features in context with other relevant graphic information. The invention provides for smoothly calling forth a set of graphic data to inform and stimulate a sustained, multi-faceted, analytical thought process.

The software may be deployed as a stand alone application and on enterprise, intranet, and internet networks. It may be used in traditional personal computers and in future computer systems employing screens that may be flat, wireless, and/or pressable or pen-responsive, that may be larger or smaller than current PC screens, and that may be as portable, thin, foldable or rollable as a paper map or chart (see FIG. 1b).

The graphic-information flow method and system for visually analyzing patterns and relationships is realized through computer software. The present invention consists of template computer software for publishing a set of materials in a format that the user can smoothly browse. The software calls from a multimedia database to display a graphical user-interface (GUI) and alter it in response to user commands. The GUI has a central layered or slotted map area surrounded by control panels.

The software employs "smart" graphics as symbols on maps and control panels. The graphics are "smart" in that they can be programmed to respond to user commands, calling to a database to cause an action. Users click control panel keys and query boxes to fill map layers and slots. Users point at and click "smart" graphics on the maps to call forth an notational text, images, sound, and video. Users at the back-end and front-end create, drag, reshape, reprogram, and otherwise change "smart" graphics with editing tools.

The graphic-information flow system software template consists of GUIs (graphical user-interfaces), multimedia databases, and the software for configuring and operating the maps. The GUI is designed to permit operation on a variety of existing and future hardware devices; and the software can be developed using commonly available software languages, database programs, and electronic information systems.

Software on the server and client performs a number of functions. The template software enables customization of the database features, attributes, symbols, annotations, and topic organization; of the GUI layout; and of the animation and query configurations. GUI and database tools are provided for initial mapset creation and subsequent editing by authorized editors, dynamic databases, and public users. Software components include map and database interfacing; dynamic generation of graphics, imagemaps, and code; and user-tracking and activity-reporting. Directory and query box formatting automatically turns text lists into formatted top-layer graphics with retrieval bars and key extenders as necessary. The software uses "smart" graphics to provide for interactive keys and map features, map graphics layering and slotting, querying, and notation and publishing tools. The software also accommodates signaling from input/output devices such as GPS and adaptation to future input, output, and selector devices.

Special control apparatus are used extensively throughout the system's graphical user-interfaces to retrieve layered indexes, keys, and map content. These special control apparatus enhance the ease of browsing while accommodating the size and resolution limitations of the computer screen. These preferred special control apparatus are designed to improve operation, but are not required and do not preclude use of other special control apparatus.

Five special control apparatus augment the index, key, and map configurations. First, message boxes within the map area show updateable text data. The message is typically: 1) the name and other tabular data for a feature in response to the cursor pointing to the feature, or 2) data for a set of features which is updated dynamically as time-sensitive information is changed in the database. Small message boxes also may appear as pop-up feature labels atop the map. Message boxes may be used for the viewer to type text input. Second, retrieval bars are used for switching information in indexes, keys, message boxes, and pop-ups. Retrieval bars use graphical or alphabetical segments that provide an improved alternative to traditional scroll bars. Third, key extenders revise control panel and message box content via overlays and pop-ups. Key extenders provide means for selecting additional feature attributes and for switching topics and sets of keys or message box contents. Keys are extended by clicking on topic titles or arrows. Fourth, query boxes, that may be in the form of key extenders or map area pop-ups, provide means for selecting multiple attributes for a complex query. A query is requested by clicking a button; and the results are returned by updating the map area. Fifth are user editing and publishing tools along with interactive how-to guides and tutorials that take new users through notation and publishing procedures.

Having the foregoing objects and functionality in mind, attention is now directed to a specific implementation of the invention. Referring now to FIG. 1a, the inventive system is first presented in functional block diagram form. Specifically, the system includes one or more workstations or other personal computer devices 10 with both local programming 11 and communication 30 to a remote server 20. This server includes additional programming 24 to assist operation and a central multimedia, relational database 21 and 22 containing a number of support databases stored in high capacity memory. Exemplar memory modules include Base memory 21 and Topical memory, 22. In this context, select mapping elements commonly known as Base elements will be stored in the Base memory module and the Topical elements in the Topical memory module. As database entries, these elements are available for high speed delivery to each of the personal computer devices, either sequentially or concurrently, via the network link 30. A user-tracking memory module 23 stores data about each user's activity. To enhance this dynamic capability, the system includes an expanded link to the Internet or other network connections 50 so that the vast array of Internet or network source materials may be accessed and combined with the base and topical data of the central database and thus become available as information for mapping onto the selective two dimensional display. In addition to the role as a source for database information, the Internet and other network connections permits remote process control of the database content, including access and editing functionality via the personal computer devices 10. FIG. 1b shows alternative personal computer devices such as (a) high-resolution, large-scale, flat map display, (b) large-scale, wall-mounted display, (c) wireless, portable map and remote server, (d) portable, flexible, roll-up, flat map display, (e) portable, fold-up, flat map display, and (f) map expands and contracts as display is stretched or folded.

Turning now to FIGS. 2a–c, the system components are depicted in exploded view format. In these diagrams, arrows are used to indicate command and data flows. FIG. 2a depicts the primary command and data flow between the client and the server. To permit the seamless custom data flow to the presentation, the system display includes a map area 303 for imaging the map elements as recalled from the server 200. To control data selection and access, an interactive control panel with map keys 304 is displayed on a portion of screen real estate, with selections thereon governing the map area. When the User 301 causes a user-event such as a mouse click to the map or control panel, a sequence of software commands occurs reflected by the arrow to the Client-side Software 101. A browser program 101.1 parses the request and runs the client agent software 101.2 which may consist of HTML, Javascript, CGI, Java, ActiveX and/or other code. The client agent software processes the request and alters the map area image reflected by the arrow back to the display. If a complex query, additional graphic files, or updated information is required, the client agent sends a request to the server software 102 and multimedia relational database 200 that may reside on the client or across a network on another computer. This request triggers a sequence of events which gathers and assembles the graphic material on the server and sends it back to the client for display.

Importantly for the invention and as is discussed in detail in FIGS. 2b and 2c, elements comprising separate layers are stored in addressable databases, including central server files and databases 200 (comprising base 202 and topical 203 data sets, graphics files 204, and user-tracking database 404) wherein the grid depiction reflects data fields for each cell. The server software first uses a daemon 102.1 to report to the user-tracking system 404 in order to record the event and to retrieve relevant information about the history and state of user's map and any files on user preferences or from a user's intelligent agent. The server software then calls a database access daemon 102.2 to query attributes as necessary and to look up in the databases 202, 203 such information as feature name, symbol, x,y location, z-layer, and annotation display data. The server then uses the results to determine which graphic files 204 to retrieve, how to plot and layer them, and how to reconfigure the interactivity of the graphics such as imagemaps (the areas of the map which respond to user events). The resulting GIF and imagemap coordinates and scripts are sent back to the client for display.

FIG. 2b represents the various system components. At the top, the two-dimensional information content of the display provided to the User 301 is depicted in exploded view as layers forming display content with the context of a geographic setting comprising elements such as rivers, streets, parks, etc. As can be seen, the layers are each characterized with select information that is of varying importance to the User. The base map elements are pulled from the base database 202 when the user first calls up the mapset. The User interactively turns additional layers of map data on and off to provide a more complete but concise data presentation via interactive control panel entries as described above in FIG. 2a. The topical database 203 provides content and display information for "smart graphics" 309 on topical layers 306, text in the message box 307, and pop-up annotations 308. The interactive "smart graphics" 309 on the control panels, base, topical, and pop-up layers are associated with user-triggered scripts and data in the databases which govern changes in the control panel and map area display in response to particular user input. Additional data is retrieved dynamically from secondary and third-party databases 504 at the back-end 502 of the system, passing through a security device 505. Content providers and editors 501 can alter content via back-end interactive map interfaces 503 that send graphics files and data to back-end databases and through security to the central server 200. The user-tracking system 402 enables aggregated user-activity patterns collected in the user-tracking database 404 to be viewed on a map interface 403 by system operators 401.

FIG. 2c depicts in exploded view a slotted-format display configuration in which base data is positioned in designated sub-areas of the map rather than via x,y coordinates as in FIG. 2b. This type of slotted-format can be used for any chart layout. In the illustration, a gridded base map 305 provides the containers for a set of "smart graphic" objects 309 to be compared. Upon calling up the mapset, the viewer 301 may use the control panels 304 to query the database for a selection of objects that meet certain criteria. Once these are displayed in the map area 303, common features of the objects may be selected via the control panel key for layering or hiliting 306. By pointing the cursor at a selected object or feature, the viewer requests text data to be retrieved from the database and displayed in the message box 307. By clicking on an object or feature, the viewer requests a pop-up annotation 306 about the object.

The graphic information flow system can display images representing any place, topic, or thing. Three types of map layout within GUIs (Graphical User Interfaces) are shown in FIG. 3. The layered map, 3a is used for sets of features with relative spatial locations that can be positioned by x,y coordinates. The slotted map has sets of discrete features positioned in a grid for comparison, 3b or in a chart with slots placed to represent features' relationships, 3c. Each layout starts with a base map and a control panel, 601. The user clicks the key to select one topic for display, 602. Also illustrated in 602, the user may point at a feature on the map to view text data in the message box. To compare features, the user selects from the key another topic or attribute subset for display and comparison, 603; this may be repeated to show and compare other topics; clicking the key topic a second time deletes that feature from the display. In 604, the user clicks on a map feature to view a pop-up annotation. The interactive pop-up appears in an area away from, but near the feature which is now hilited.

FIG. 4 shows the basic GUI/database operations that the database calls as a result of the GUI Input/Output sequences of FIG. 3. The Topical Database, 203 at the center of the drawing stores a set of feature and attribute data and is updated dynamically from the back-end interfaces, 503 and back-end databases, 504 at the top left of the drawing. As Users interact with the system, activity data is recorded and stored in user-tracking system, 404 and available for User activity reports, 403.

At the bottom of the drawing, a series of GUIs as seen above in FIG. 3c are shown. The broken lines indicate command sequences from the GUI to access the data via key "mouse" selection from the Topical Database, 203. In operation 601, the User "click" to topic "AA" on the control panel key, 612 alters the map display, 611 and displays that topic. Specifically, the system retrieves the source data from the topical database, 203 and determines the symbol, pattern, and color for "AA" attribute, 210. Thereafter, the system provides the slots or layers corresponding to the "AA" attribute, as indicated by the "X"s in the column headed by the "AA" designation, 214. All corresponding data items with the "AA" attribute, 214 are then placed on the Map area, 611.

In operation 602 of FIG. 4, the user points to one feature on the map to view text data about the feature. The software determines the slot or coordinate of the cursor and finds the slot designation or x,y coordinate in column 211 of the database, 203. The software retrieves the name from column 212 and text description of the feature from column 213. It displays this text data in the message box, 614 and/or the name in the label, 613, positioning the label near the feature.

In operation 603 of FIG. 4, another feature, "DD", is selected and this is used to find corresponding entries from the topical database, 203, as indicated by the "X"s in the column under the "DD" attribute. These features are then presented on the screen, available for User review.

In operation 604, a click on a feature, 615, causes the display of an interactive pop-up annotation, 616. When the pop-up appears, the feature on the map that was clicked is hilited to retain the connection between the annotation and the feature. The configuration of the pop-up, 305 is determined by the data in columns 216 and 217, informing the software as to which graphics, text, and sound to retrieve from the file, 218. The pop-up itself may be interactive with mouse clicks triggering animations, 605, or causing new pop-up cards to be displayed, 606.

In order to call forth another mapset, the user clicks an index or a context map or diagram, 607. The context control, 617 shows the present location of the current map in the mapset. Clicking its hilited areas calls up the master directory or switches to other maps. The other maps may be another representation of the same data or a related information set.

The initialization of the program, navigation to the desired mapset, and manipulation of the interactive map are depicted generally in the flowchart of FIG. 5 and begins with the start up, 100 when the User clicks on the program icon to enter the system. The resulting actions include the recording of a User ID in the user-tracking system, 190 and the system calling up the program from a CPU, CD-ROM, network, or internet server. The start-up screen is displayed with a base map or a directory of available mapsets. A directory may have a text or graphic table of contents or index; or it may be a single graphic representation of the contents such as a world map or other overview image, or a combination of the two. The how-to event, 101 is optional and may be accessed at any point. It involves the User clicking on a "how-to" button. The program calls up a screen or animated overlay with information about how to use the program. This is preferably a short animated sequence on top of a view of the directory (if applicable) or on top of a view of a base map. In the directory or base map key, Users may be given a choice of written languages which is noted as a variable and referenced whenever words are displayed.

If the software includes a directory, the User may click, 102 on a directory extender control apparatus. The directory will then be revised. The program will call up additional subdirectory text or zoom in on a world map or overview image. This process is repeated until the desired mapset is identified by title or image. The selection of the desired mapset is accomplished via event, 110 in which the User clicks on a mapset title or image. The program displays a base map for a mapset of a place, topic, or thing. The selected mapset is recorded in the user-tracking system, 190 and subsequent user-events are also recorded, 191–194.

Once the base map is displayed, the User will use the control panel key to select the first topic set for display on the base map. The User may first need to click on the key extender, 120 to revise the key in order to view the desired feature-set. The User clicks on a key symbol, 121, and the feature-set is displayed on the map. To accomplish this, the program searches in the database and recognizes the feature-set (layer) associated with the x,y coordinate of the mouse click (see FIG. 4, Operation 601). The program finds the column in the topical database for the requested feature-set. If part of the database is designated for symbols or a symbol is associated with the topic column, the program notes the symbol designated to represent the topic and finds rows with that column checked (see FIG. 4, 210). If part of the database is designated for images or "image" is associated with the topic column, the program notes which rows have an image. For each checked row, the program retrieves the symbol or image from the graphics file or cached images on the client and displays it at the designated x,y coordinate or in the designated slot, replacing the graphic of the base map.

If the symbol is not a rectangle, the program determines its shape. The shape may be a set of points for a line or polygon or a bitmap graphic with a mask. The program alters the map only for the area within the symbol. If the symbol (typically a shape or polygonal area) is designated as transparent, the program calculates the alteration of the underlying map colors within the area. For gridded slots each showing images of similar objects for comparison, the appropriate feature of the object is hilited. For layers or slots, a hilite may be an outline or filled shape; it may be opaque or a transparent tone altering the color of the underlying image.

If the User clicks on the same key symbol, 122, the feature-set is deleted on the map. The program repeats the actions of 121, but deletes the symbol or images by displaying the appropriate portion of the base map image (stored in the user-tracking database) in its place. If the User clicks on a symbol or label in a query box or enters text in a query box, 130, the feature-set is displayed on the map by another means; as follows. The program repeats the actions of 121, but searches for multiple columns to be checked or searches for text matches in a column. It displays a symbol, image, or hilite at the designated x,y coordinates or in the designated slot, replacing the graphic of the base map.

The User then will click another key symbol or query, 140 adding a new feature-set to the map. The program repeats the actions of 121, but does so in comparison with other symbols, images, or hilites currently displayed (see FIG. 4, Operation 603). If two symbols have the same coordinates or overlap, the program uses an algorithm to adjust the placement of the symbols so that all or part of both are visible, and determines which should be displayed on top of the other. If the topics use patterns, colors, or hilites as symbols, the program determines a third, combined pattern, color, or hilite to signify its representation of two attributes or for the overlap. For an "and" query, the program will hide previously visible symbols for features that do not have all the attributes. This action may be repeated to add other symbols; and keys for visible features may be clicked to hide their symbols.

Two means of viewing annotational material about map features are possible. First, if the User points with the cursor (mouseOver) at a feature (symbol) on the map, 150, a message and label may be displayed (see FIG. 4, Operation 602). The program searches in the database and recognizes the feature associated with the x,y coordinate of the mouse location. If there is a message box on the map, the program displays text from the database in the message box of the map. If labeling is being used, the program reads the name for the feature from the name field. It calculates the size of the label based on the number of characters and the width of the font being used to size the label. It displays a label with the name next to the map symbol or in the slot; the label may have a line that connects the symbol to the label set at a distance to allow viewing of the area surrounding the symbol. A default location in relationship to the map symbol or slot determines its positioning. If the label would go outside of the map area or is too long for the slot, the program shifts it to an acceptable position. When the User moves the cursor away from the symbol (mouseOut) or clicks the symbol, the label is hidden, but the message box information may remain.

Second, if the User clicks on a map symbol, 151, the program displays a hilite around the map symbol and a pop-up is displayed. The program searches in the database and recognizes the feature associated with the x,y coordinate of the mouse click (see FIG. 4, 604). If the row has pop-up annotations, the map symbol is hilited and the first pop-up card is assembled as described in the database (see FIG. 4, 305). The program calculates the quadrant or portion of the map within which the x,y coordinates of the map symbol are located. It then determines another appropriate quadrant or portion of the map over which the program will display the pop-up. It then replaces that quadrant or portion with an image that combines the shadowed pop-up edged by the visible map graphic surrounding the pop-up.

The pop-up itself may be interactive. If the User clicks on a pop-up hot spot (a button, object, icon, or imagemap), 152, the pop-up is altered (see FIG. 4, 605). The pop-up displays additional information including links to other graphic and text data, animations, and sounds based on information in the database (see FIG. 4, 216, 217). If the User clicks on a pop-up comer, 153, the pop-up changes to a new card. The program retrieves the next or previous pop-up card based on information in the database (see FIG. 4, 606). For written languages that read from left to right, clicking on the right comer calls the next pop-up card, and clicking on the left comer displays the previous card. This may be reversed for languages that read from right to left. Forward and back arrow symbols may be placed on the comers.

If the User clicks on a symbol or map while the pop-up is showing, 154, the pop-up is hidden. The hilite of the map symbol is deleted and the original map replaces the pop-up in the quadrant or portion of the map. Clicking a key symbol also hides the pop-up before altering the map display. The program may be set up so that clicking on another visible map symbol will simply replace the contents of the pop-up and reposition it if appropriate.

If the User clicks on a notation tool for text, lines, or shapes in the control panel, 160 optional, the cursor changes to the I-beam (for text) or a cross (for a line or a shape). The User presses on the map and types or drags. Upon release, text, line, or shape notations are made on top of the map and recorded in the user-tracking system. The notation layer symbol is hilited on the key (additional notation layers may be provided). When the User clicks on a key symbol for the notation layer, the notations are hidden or shown.

User-editing, 170, is optional for public users; this is the process whereby authorized Editors add information via a password-protected back-end interface (see FIG. 4, 503). When an Editor or User clicks on a symbol tool in the control panel or in an edit or tools menu, a new symbol is created. A copy of the selected symbol is positioned on an appropriate place on the control panel or map. The new symbol is hidden and shown several times to call attention to it. When the Editor/User presses on the new symbol and drags to a position on the map, the symbol is moved. The symbol is repeatedly repositioned to the x,y coordinate of the cursor. If the cursor moves beyond the map boundaries, the symbol stays at the edge of the map. When the Editor/User releases, a row is added to a database with the symbol, an ID number, and its x,y coordinates.

Authorized Editors' changes are entered in the base map or topical databases, as appropriate. For public users, the row is added to the user-tracking system database within a user-added layer associated with the User ID. A data entry dialog box appears in which the Editor enters name, message information, and pop-up data; this is optional for public users. When the Editor/User enters a name and other data and clicks "OK", the data entry dialog box disappears. The name and data are entered into the database row of the new symbol and then are called up when the User clicks a new symbol, 150, 151, 152. If the Editor/User does not press a new symbol or clicks "cancel" in the data entry dialog box, an alert message appears asking the User if they want to delete the symbol. If the User clicks "yes" or "cancel", the alert dialog box disappears and the new symbol is deleted. If "no", the data entry dialog box reappears. If the Editor/User clicks the delete-symbol tool and clicks on a user-added map symbol, a symbol is deleted from the map and the row is deleted from the database. An "Are you sure?" dialog may appear before doing so and the User may thereby cancel the deletion.

Editing may also be done via a database interface. If the Editor/User clicks on "view database" in the control panel or in the edit or tools menu, the appropriate portion of the database appears in the map area. Any fields that may not be edited are grayed. The Editor/User may add rows and enter text in the database. The Editor/User may toggle between the database interface and the revised map to view and modify changes.

Users may save, print, and publish their mapsets, 180. When the User clicks on the "save" button or menu, the mapset is saved. When the User clicks on the "print" button or menu, the mapset is printed. When the User clicks on the "publish" button or menu, the mapset is published online.

EXAMPLES

Figure 6C:
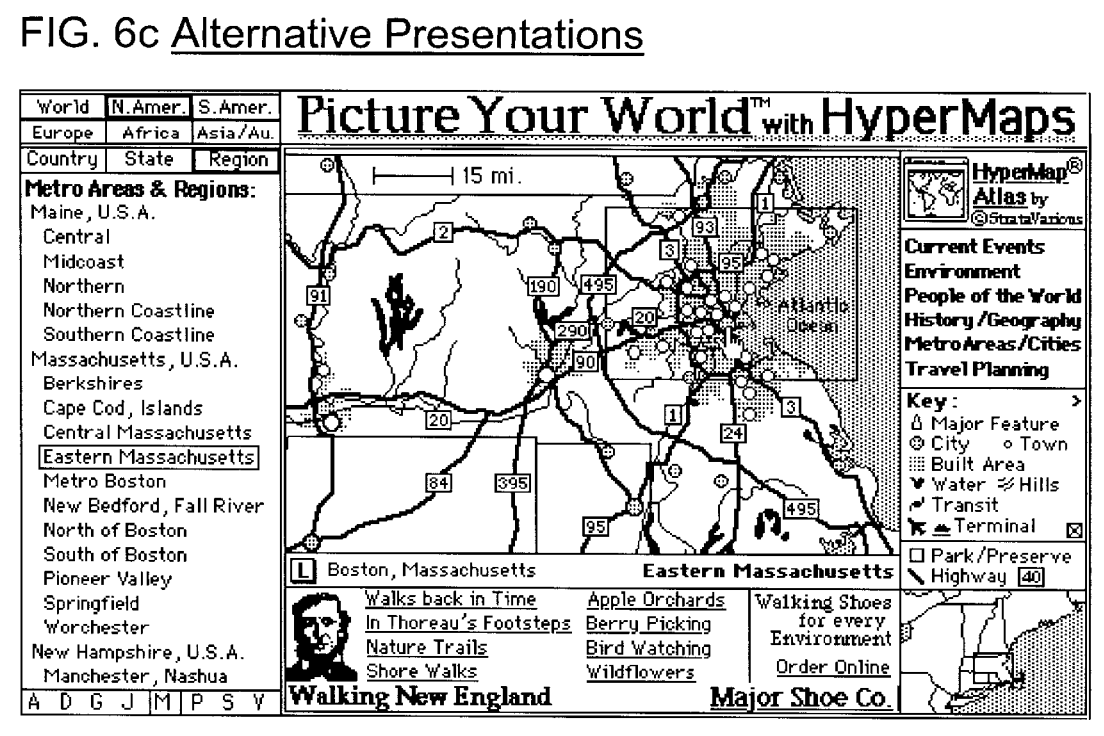

An exemplar GUI (Graphical User-Interface) layout and its components shown in FIG. 6a is designed to organize information from an extensive, complex data set. The special control apparatus maximize ease in retrieving subsets from the database. The navigation to the desired map can be accomplished via an optional index, 1–4, on the left by clicking on bar segments and list items. Retrieval Bar, 1, for switching categories of mapsets and Retrieval Bar, 2, for switching subcategories of mapsets call forth clickable lists of mapsets, 3, within the selected category and subcategory. The example shows a list organized in alphabetical order. Retrieval Bar, 4, is used for calling forth additional list information. The hilited segment designates the portion of the list that is displayed; clicking another letter calls up the portion of the list starting with that letter. Clicking on a map name in the list brings its base map into the Map Area. Orientation and navigation within a set of maps is accomplished via the Context Map, 5 in lower right, which shows the location of the present map within the next higher level map. Clicking outside its toned area, calls forth the next higher level map (zoom-out). Zoom-in capabilities, 5a, are provided via a key-accessed layer showing clickable zoom-in areas on the main map. Clicking on the "Home" icon, 6 upper right, retrieves the top-level map of the mapset.

Upon retrieving the desired mapset with its basemap visible in the Map Area, the user may click on the Topic Selector, 7, to retrieve site or object information for a particular topic in several ways. Clicking the underlined topic name will replace the base key with a topic-related key. Clicking on the box to the left of the topic name will call forth a query box in the key or as a pop-up (see FIG. 6b). Clicking on the down arrowhead will replace the topic list with a list of subtopics. The retrieval bar above the list shows the number of levels of topics and subtopics including and above the current subtopics list; clicking a segment will return to the higher-level topics list. Clickable keys are used to show and hide overlays to the basemap in the Map Area. The key, 8, shows a set of symbols; when a symbol is clicked, the software calls to the database to show all that type of site or object positioned properly on the map. Keys for additional types of site or object are accessed by clicking on the "next" and "back" arrowheads at upper right of key, 8a.

The central Map Area displays the content as sets of map symbols. Map symbols, 9, for sites and objects with information in the database are "hot." Pointing at a symbol will call forth into the message box, 10, the site/object's name and descriptive material. The message box is also used as a title bar to display the mapset title and subcategory title, 10a. Clicking on a map symbol will cause it to become hilited and a pop-up, 11, to appear in a part of the map other than that in which the symbol is located. The pop-up has interactive, annotational material about the site or object. The material in the pop-up may be presented on multiple cards that are retrieved via the segmented retrieval bar, 12, at the bottom of the pop-up. Special theme keys, 13, may be provided below the map. Sponsor name and message, 14, may also appear in this belowbar. Publisher, editor, and access to use, restrictions, and other reference information, 15, may be located in the key or belowbar.

FIG. 6b shows a pop-up query box. The retrieval bar, 1, is clicked to call forth lists of attributes. The attribute list, 2, is clicked to select attributes which appear in the selections list, 3. Clicking the "plot" button, 4, causes the query box to disappear, the requested query to occur, and symbols representing sites or objects that have the selected attributes to appear in the map area.

FIG. 6c shows an embodiment of the GUI layout with each of the components diagrammed in 6a. FIG. 6d shows another embodiment of the GUI layout within a World Wide Web browser. The user has undertaken a search for a selection of hotels by clicking the box to the left of the topic "Lodging" and thereby called up the "Lodging" query box for selection of query criteria, 6e. A list of applicable hotels with a retrieval bar then appeared in the key area; this list may be clicked to have a particular hotel hilited on the map. The User has also clicked the key and special theme selector in 6d to view subway stops, trolley-boat tours, and scenic views. The user has then clicked on a hotel symbol on the map to view annotational material in the message box and pop-up, 6d.

In FIGS. 7a–g an example is provided depicting the use of the present system for assessing sophisticated geographic information. The series illustrates how a vast amount of information can be organized within a single, small screen and how its layered data can be retrieved by means of exemplar special control apparatus. The sequence begins with a user browsing a series of interconnected, geographic maps. Beginning with screen display 7a, a base map of the world is provided in a two-dimensional presentation. This interactive, layered map can be easily reconfigured by the user. In this display, the control panel includes the following topics specific to the first base map:

1. Current Events
2. Environment
3. People of the World
4. History/Geography
5. Metro Areas/Cities
6. Travel Planning In this example, the User has selected the "Current Events" topic in the control panel, resulting in a second key of subtopics:

1. Time/Sun-Shadow
2. Weather
3. Geography & News
   a. Government
   b. Science/Nature
   c. Business
   d. People The user wishes to view the time in different cities of the world, weather, and news. As new data are called for, the system pulls from third-party databases and public information Web sites; and it dynamically refreshes the display with the most current entries. Pointing at a "hot news" symbol has called forth a headline in the message box; clicking it would call forth an interactive map of the news site in place of the world map. Further maps on weather as well as geographic information on news stories can be called up by clicking on the Current Events key. In FIG. 7b, the user changes the cities on the clock and map by clicking on a city name to call forth an overlay selector-list. The viewer selects a new city by clicking "Athens" on the list; the city circle moves to the position of Athens and the name and time of Athens replaces those of the previous city from that portion of the world map. Clicking the clock name again hides the selector-list.

The interactive world map is also used as a directory to an extensive map atlas. The world map can be clicked to zoom into regional mapsets; or the index listing the map locations (to left of map) can be used (see FIG. 6a, 1–4). The index can be clicked to show other world maps; the retrieval bar at its top can call up lists of continent, country, state, and region maps. In this scenario, the user clicks "Travel Planning" on the topic index (to right of map) and the related key appears below, shown in FIG. 7c. The user then clicks "Travel Packages" in this key. FIG. 7d shows that a new control panel has now replaced the key (it can be hidden by clicking the topic selector "Travel Planning"). The>and<arrowheads in the key can be clicked to flip forward and backward to view additional travel packages. The user has selected a city of origin and a week by clicking on the up and down arrowheads. Symbols then appeared on the world map showing available trips. Pointing at the Hawaii map symbol has caused descriptive information to appear in the message box and belowbar (below the map). Clicking on the belowbar>arrowhead would call forth data on additional packages. Clicking on "View" would place interactive descriptive maps, images, and text on top of the world map; clicking "View" again would hide the description. Clicking on a continent name below the map would call forth a continent map showing travel packages.

The user now clicks on Hawaii on the world map or the index of FIG. 7d. Note that an alphabetical retrieval bar can be used on the bottom of the location index (at left) to scroll through the list. The user has proceeded from a full map of the islands to a mar of the Big Island of Hawaii, FIG. 7e by clicking on the context map at lower right. Clicking on the Beach symbol on the key has caused symbols for beaches to appear on the map. Clicking on the belowbar special theme selector has called forth an overlay showing the area covered by rainforest. Pointing at a natural-features symbol (for Akaka Falls) on the map causes its name to appear in the message box; clicking the map symbol pops up a description. The pop-up itself has several interactive features. Clicking the speaker symbol on the pop-up would run an audio/video clip of the waterfall in place of the photograph. Clicking on plant names would cause an image of the plant to appear in place of the waterfall. The retrieval bar at the bottom of the pop-up shows that there are four cards in the pop-up with the first showing; clicking other segments would call forth other interactive cards about the subject.

In FIG. 7f the user has clicked to zoom into a nature reserve and intersects with the mapset and database of the naturalists studying the area. The visitor can get a picture of what the hiking trails are like and learn about the ecosystems. The scientists create and study the interactive maps to discern relationships between various elements of the environment. In the example, a biologist compares overlays showing the location of plants and animals to study how they coexist. The biologist has selected specific insects and plants for display via the categories at the top of the key. He has chosen to view only the territory of one insect and one plant to study their interrelationship and their relationship to the general land form. Numerous other layers can be shown and hidden quickly via the key. In this way, only the set of material of interest at the moment is viewed, without distraction of irrelevant information. The biologist has clicked on the "Plant Species" key box to access the database. The query box has appeared and is being used to identify and map other species having certain criteria. The characteristics are clicked on the list at the left of the query box and they appear as selections at right. The retrieval bar at the bottom left of the query box calls forth other choices. Once all criteria are selected, clicking on the "plot query" button maps species that meet the criteria. A clickable list appears in place of the key, FIG. 7g; the list can be hidden and recalled by clicking on the "Plant Species" key label.

The results of the plant species query may also be viewed in a slotted map by clicking on the "Grid" or "Graph" selectors in the key, 7g. FIG. 7h, shows a comparable display for a selection of insects. This type of slotted map serves as a catalogue for viewing and comparing objects side by side. The interactive key enables further queries and the showing and hiding of features. The hilite capability can call out a particular common feature on each image (e.g., the thorax, the wing's subcosta vein) and may gray the rest of the image. The material in the slots may be layered to show cross-sections of things such as an insect's internal anatomy. An interactive pop-up, flip-thru storybook provides descriptive material about each object; note the subject-headed retrieval bar. The biologist views images of plants and insects collected in the study area along with those that have been archived. The biologist can also access via the internet other researchers' information on similar species from islands around the world. Over the years, a database is compiled from field investigations. Weather data is collected and updated dynamically from field stations. The scientists have used the back-end interface to add their research data via both a database interface and a map interface. The biologist views a chart of weather data, FIG. 7i, onto which can be layered time periods related to biological processes. He looks for cause and effect by studying the hatching of an insect, the blooming of a flower, and the patterns of sunny, rainy, and foggy days via the species key below and the pattern analysis key at right.

FIGS. 8a–h show the use of layered indexes and keys with key extenders and retrieval bars to organize and access a large information set. FIG. 8a shows a sidebar panel with topics list and a symbol key. The>arrowhead on the key for 8a can be clicked to retrieve the key in 8b whose>arrowhead can access further keys and go back to the first key. If "Environment" is clicked on the topics list of 8a or 8b, the subtopics list 8c appears. If the down arrow to the right of "Animal Species" is clicked on this list, subtopics list 8d appears. If the down arrow to the right of "Birds" is clicked on this list, subtopics list 8e appears. The retrieval bars at the top of the subtopics lists indicate how many levels down the current subtopic list is; the bars can be clicked to move back up the hierarchy of lists. Clicking on the underlined subtopic titles in a list will show and hide its special key as shown in 8f and 8g. The retrieval bar at the bottom of the key in 8g and 8h alphabetically retrieves features. The retrieval bar switches features lists by other means, in this case by Common or Latin name, by month of the sightings, and by showing either the Full Listing of features or those from any one of three queries.

Figure 9C:
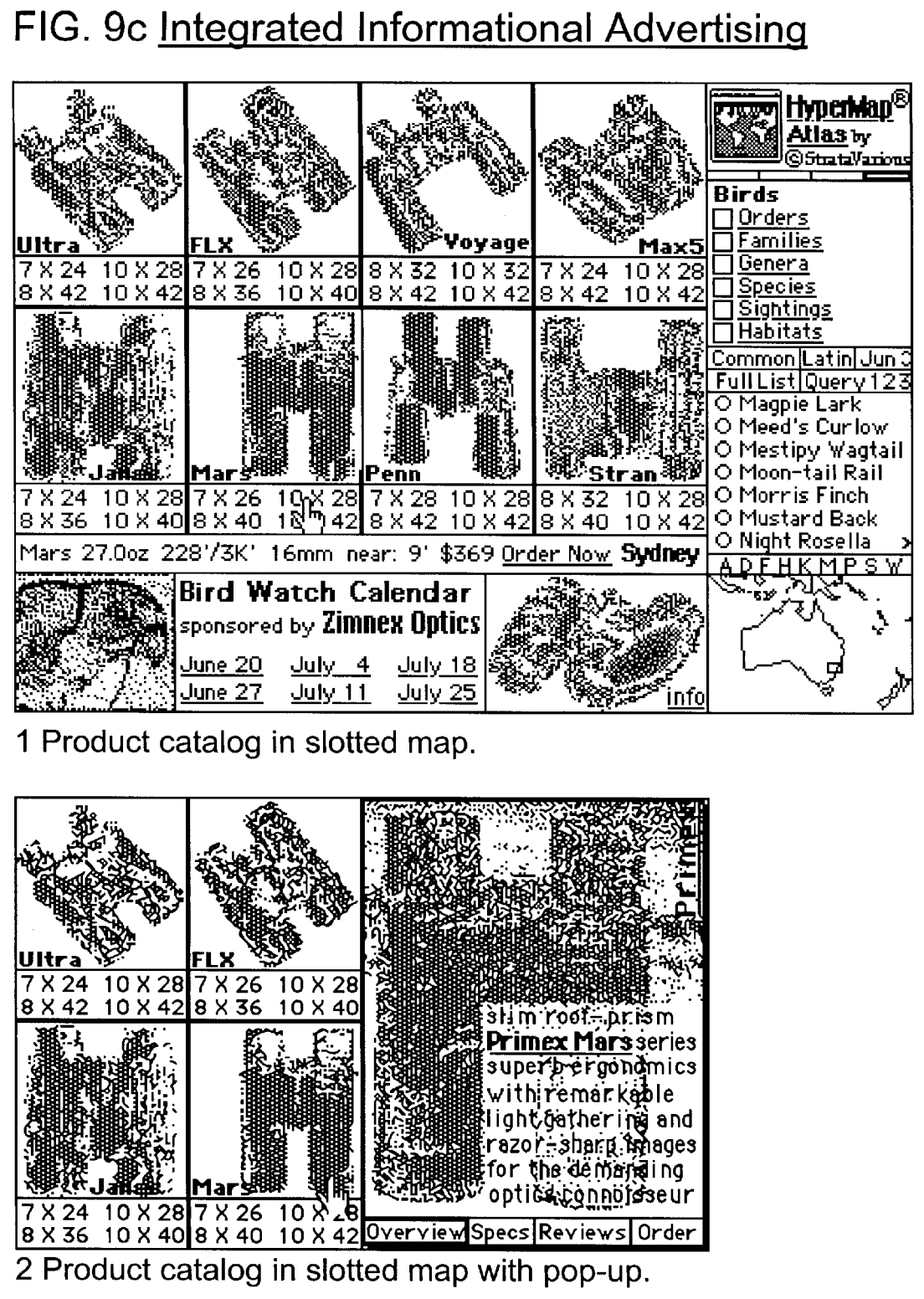

FIGS. 9a–d show examples of informational advertising integrated into the present system. In FIG. 9a, a pop-up flip-thru storybook appears when the viewer clicks a "Lodging" symbol on the map; clicking on the pop-up's index replaces the pop-up with new cards as shown below. In another form of integrated advertising, FIG. 9b, the below-bar contains the key for a special theme, "Walking Sydney," while providing a "brought-to-you-by" message of the walking shoe sponsor and a link to related product information and online ordering. Here the viewer has clicked on the sponsor's message and a map has appeared showing available walking shoes appropriate to a set of sites. In FIG. 9c, a slotting system is used in an online catalogue to present for comparison a category of products from many producers. In this case, when the viewer called forth the "Birds" subtopics under the "Environment" topic, a binocular distributor's special theme selector and message appeared; then when the word "info" was clicked, a slotted map of binoculars appeared. Clicking a slot calls up an informational pop-up. FIG. 9d shows an interactive map-format report that plots information about viewers of ads that sponsored the world map illustrated in FIG. 7a. When a user entered the map atlas site, an id number was assigned to return the proper map layers; this system is also useful as a market analysis tool. The user-tracking system records anonymous user-activity that can be configured as such an interactive map-based report.

FIGS. 10a and b show a variety of map displays derived from the same database. The components of the graphical user-interface of the present invention are depicted as active regions on the screen of a User's workstation, 1. In this context, the system provides frame components, including Map area (a), message box and pop-up label (b1 & b2), right control panel (c), bottom control panel (d), left control panel (e), corner control panel (f), and finally the pop-up storybook (g). A portion of a topical database is illustrated in 3; five examples of maps created from this same database are illustrated in 4–8: exemplary use of the framework components are provided in the slotted map (4), layered map (5), slotted and layered graph map (6), gridded matrix and use of pop-up storybook (7), and layered and slotted map with use of pop-up query box (8) for selective display of information relating to gardening. FIG. 11 shows an example of a three-dimensional model that can be rotated. With the addition of a topics list and key, it becomes a "map" and has feature and attribute data that can be shown and hidden, hilited, queried, and annotated.

Although the invention has been described in detail for the purpose of illustration, it is to be understood that such detail is solely for that purpose and that variations can be made therein by those skilled in the art without departing from the spirit and scope of the invention.

What is claimed is:

1. A data processing system of organizing, retrieving, and displaying data within a computer system to enable repeated viewing of different, user-selected subsets of elements, comprising:

a. a database and associated software for storing, organizing, and retrieving data about elements and their attributes;

b. a display for displaying a visual representation of selected subset elements for comparison, with:

1. each of the different, user-selected subsets given its own symbol or common image format; and 2. each element's symbol or image given a slot on the display; this slot may be:

i. designated by x, y, and z locations representing its real or symbolic relationship to other elements; or ii. within a grid; and c. control apparatus for showing and hiding subsets on the visual representation which include:

1. display control panel(s) with graphic and text-list selectors that, in response to user events or automatic updating systems, call to the database to determine subset elements to be added and subtracted from the visual representation;

2. alternatives to scroll bars which enable graphic and text-list selectors to be displayed in discrete, layered blocks, any one of which may be called forward by clicking, or otherwise signaling, on a segmented bar, arrowhead, or other symbol.

2. The system of claim 1 wherein said elements relate to an interactive two-, three-, or four-dimensional map or diagram of a place, topic, or thing.

3. The system of claim 1 wherein said selected elements comprise information forming a computer or online alternative to reference documents, including atlases, encyclopedias, text books, natural history guides, travel guidebook listings, yellow pages directories, product catalogues, machine manuals, and land-use planning reports.

4. The system of claim 1 wherein said selected elements comprise information forming a computer or online specialty store where consumers can ask to see and compare all the available offerings for a particular category of product from one or a multitude of manufacturers and distributors.

5. In combination in a program-controlled data-processing system for controlling an infrastructure for presenting a collection of user selected information elements to facilitate translation of complex topical data to an enhanced display format, comprising:

a. Display control panels for receiving user commands and implementing a selective layering of data in the form of graphics, text and/or images onto a base presentation wherein said control panel includes control icons and text lists for manipulating the content of said selective layers in accord with user defined objectives;

b. Database comprising one or more data elements for use in providing the substance to said layered data wherein said data elements are located in addressable memory in said database;

c. Central display controller in communication with said database and said control panel for interpreting commands received by said control panel and directing the placement of data elements in accordance with a pre-programmed hierarchy; and d. Display, interconnected to said central display controller for receiving image data including a base image and one or more selected layers for visual perception by said user.

6. The system of claim 5 wherein database further comprises database elements for supporting slotted map data for incorporation into said image data on said display.

7. The system of claim 5 wherein said display is a two-dimensional matrix of pixel elements characterizing said data elements.

8. In combination in a display management system for displaying complex data elements relating to subjects wherein said data elements include three-dimensional graphics and/or images comprising:

a. first database having a plurality of data elements on a subject and its graphic information, said elements are stored in volatile memory and said first database capable of being refreshed with current data from a second database;

b. A display processor characterized by a controlling program that provides one or more users with control icons on said display for selectively recalling collections of data; said icons further arranged in hideable panels;

c. Communication means for linking said first database with said second database to provide for refreshed data elements therefrom; and d. Display for providing a multi-dimensional presentation of selected data element layers in accordance with user commands and said program controlling logic.

9. The system of claim 8 wherein said communication means is a public access network.

10. The system of claim 8 wherein said control icons are further characterized by descriptive text that is selectively displayed to enhance navigation and information display.

* * * * *